United States Patent
Gannon et al.

(10) Patent No.: US 10,353,201 B2
(45) Date of Patent: *Jul. 16, 2019

(54) SKIN-BASED APPROACH TO VIRTUAL MODELING

(71) Applicant: Autodesk, Inc., San Rafael, CA (US)

(72) Inventors: Madeline Gannon, Pittsburgh, PA (US); Tovi Grossman, Toronto (CA); George Fitzmaurice, Toronto (CA)

(73) Assignee: AUTODESK, INC., San Rafael, CA (US)

(*) Notice: Subject to any disclaimer, the term of this patent is extended or adjusted under 35 U.S.C. 154(b) by 373 days.

This patent is subject to a terminal disclaimer.

(21) Appl. No.: 14/968,690

(22) Filed: Dec. 14, 2015

(65) Prior Publication Data

US 2016/0171127 A1 Jun. 16, 2016

Related U.S. Application Data

(60) Provisional application No. 62/092,205, filed on Dec. 15, 2014.

(51) Int. Cl.
*G02B 27/01* (2006.01)
*G06F 3/0488* (2013.01)
(Continued)

(52) U.S. Cl.
CPC .......... *G02B 27/017* (2013.01); *G06F 3/005* (2013.01); *G06F 3/0487* (2013.01);
(Continued)

(58) Field of Classification Search
None
See application file for complete search history.

(56) References Cited

U.S. PATENT DOCUMENTS 6,498,961 B1 * 12/2002 Hermet ................... B44C 3/042
156/232
2010/0256966 A1 * 10/2010 Cowley .................. G09B 23/30
703/11

(Continued)

OTHER PUBLICATIONS

Braitenberg, V. "Vehicles: Experiments in synthetic psychology". Cambridge, MA: MIT Press. 1984.

(Continued)

*Primary Examiner* — Michael Lebentritt
(74) *Attorney, Agent, or Firm* — Artegis Law Group, LLP

(57) ABSTRACT

A design engine for designing an article to be worn on a human body part (input canvas) in a virtual environment. A virtual model engine of the design engine is used to generate and modify a virtual model of the input canvas and a virtual model of the article based on skin-based gesture inputs detected by an input processing engine. The gesture inputs comprise contacts between an input tool and the input canvas at locations on the input canvas. The virtual model engine may implement different design modes for receiving and processing gesture inputs for designing the article, including direct manipulation, generative manipulation, and parametric manipulation modes. In all three modes, a resulting virtual model of the article is based on physical geometries of at least part of the input canvas. The resulting virtual model of the article is exportable to a fabrication device for physical fabrication of the article.

24 Claims, 13 Drawing Sheets

(51) Int. Cl.
G06F 3/0481 (2013.01)
G06F 3/0484 (2013.01)
G06T 19/20 (2011.01)
G06F 3/0487 (2013.01)
G06T 15/10 (2011.01)
G06T 17/20 (2006.01)
G09G 3/00 (2006.01)
G06F 17/50 (2006.01)
G06F 3/00 (2006.01)

(52) U.S. Cl.
CPC ...... G06F 3/04815 (2013.01); G06F 3/04842 (2013.01); G06F 3/04845 (2013.01); G06F 3/04883 (2013.01); G06F 17/5018 (2013.01); G06T 15/10 (2013.01); G06T 17/20 (2013.01); G06T 19/20 (2013.01); G09G 3/001 (2013.01); G06F 2217/32 (2013.01); G06T 2219/2021 (2013.01)

(56) References Cited

U.S. PATENT DOCUMENTS

| | | | |
|---|---|---|---|
| 2013/0179805 A1* | 7/2013 | Wyser | G06F 3/0483 715/759 |
| 2013/0278592 A1* | 10/2013 | Kranzberg | G06T 19/00 345/419 |
| 2014/0223777 A1 | 8/2014 | Whiteman et al. | |
| 2016/0078663 A1 | 3/2016 | Sareen et al. | |
| 2016/0171126 A1* | 6/2016 | Gannon | G06F 17/5018 703/1 |

OTHER PUBLICATIONS

Chan, L., Liang, R-H., Tsai M-C., Cheng K-Y., Su, C-H., Chen, M.Y., Cheng, W-H., and Chen, B-Y. "FingerPad: private and subtle interaction using fingertips". UIST '13. 255-260.

Chen, K., Lyons, K., White, S., Patel, S. "uTrack: 3D input using two magnetic sensors". UIST'13. 237-244.

Coros, S,. Thomaszewski, B., Noris, G., Sueda, S., Forberg, M., Sumner, R., Matusik, W., and Bickel, B. "Computational design of mechanical characters". ACM Trans. Graph. 32, 4 (July), 83:1-83:12.

Follmer, S., Carr, D., Lovell, E., and Ishii, H. "CopyCAD: remixing physical objects with copy and paste from the real world". UIST '10, 381-382.

Follmer, S., and Ishii, H. "KidCAD: digitally remixing toys through tangible tools". CHI '12, 2401-2410.

Gustafson, S., Holz, C., and Baudisch, P. "Imaginary phone". UIST '11, 283-292.

Harrison, C., Benko, H., and Wilson, A.D. "OmniTouch: wearable multitouch interaction everywhere". UIST '11, 441-450.

Harrison, C., Ramamurthy, S., and Hudson, S.E. "Onbody interaction: armed and dangerous". TEI'12, ACM Press (2012), 69-76.

Harrison, C., Tan, D., and Morris, D. "Skinput: appropriating the body as an input surface". CHI'10. 453-462.

Hincapie-Ramos, J-D,. Guo, X., Moghadasian, P. and Irani, P. 2014. "Consumed Endurance: a metric to quantify arm fatigue of mid-air interactions". CHI'14, 1063-1072.

Hinckley, K., Pausch, R., Goble, J. C., and Kassell, N. F. "A survey of design issues in spatial input". UIST '94, 213-222.

Holz, C., Grossman, T., Fitzmaurice, G., and Agur, A. "Implanted user interfaces". CHI '12, 503-512.

Holz, C., Wilson, A.D. "Data Miming: inferring spatial object descriptions from human gesture". CHI '11, 811-820.

Kim, D., Hilliges, O., Izadi, S., et al. "Digits: freehand 3D interactions anywhere using a wrist-worn gloveless sensor". In UIST '12 , ACM Press (2012), 167-176.

Kim, H., Albuquerque, G., Havemann, S., and Fellner, D. W. "Tangible 3D: hand gesture interaction for immersive 3D modeling". EGVE '05, 191-199.

Lau, M., Hirose, M., Ohgawara, A., Mitani, J., and Igarashi, T. "Situated modeling: a shape-stamping interface with tangible primitives". TEI '12, 275-282.

Leithinger, D., Lakatos, D., DeVincenzi, A., Blackshaw, M., Ishii, H. 2011. "Direct and gestural interaction with relief: a 2.5D shape display". UIST '11, 541-548.

Lin, S.-Y., Su, C.-H., Cheng, K.-Y., Liang, R.-H., Kuo, T.-H., and Chen, B.-Y. "Pub—point upon body: exploring eyes-free interaction and methods on an arm". UIST '11, ACM Press (2011), 481-488.

Liu, Y-J., Zhang, D-L., Yuen, M-F. "A survey on CAD methods in 3D garment design". Computers in Industry, 61:6, Aug. 2010, 576-593.

Llamas, I., Kim, B., Gargus, J., Rossignac, J., and Shaw, C. D. "Twister: a space-warp operator for the two-handed editing of 3D shapes". ACM Trans. Graph 22 (3), 2003. 663-668.

Mori, Y., and Igarashi, T. "Plushie: an interactive design system for plush toys". In ACM SIGGRAPH (2007).

Mueller, S., Lopes, P., and Baudisch, P. Interactive construction: interactive fabrication of functional mechanical devices:. UIST (2012), 599-606.

Mujibiya, A., Cao, X., Tan, D.S., Morris, D., Patel, S.N., and Rekimoto, J. "The sound of touch: on-body touch and gesture sensing based on transdermal ultrasound propagation". ITS '13 , 189-198.

Ni, T., Karlson, A.K., and Wigdor, D. "AnatOnMe: facilitating doctor-patient communication using a projection-based handheld device". CHI '11, 3333-3342.

Olberding, S., Yeo, K.P., Nanayakkara, S., and Steimle, J. "AugmentedForearm: exploring the design space of a display-enhanced forearm". AH '13, 9-12.

Pottmann, H. "Architectural Geometry and Fabrication-Aware Design". Nexus Network Journal, 15:2, Aug. 2013, Springer, Basel. 195-208.

Saul, G., Lau, M., Milani, J., and Igarashi, T. "Sketchchair: an all-in-one chair design system for end users". TEI (2011), 73-80.

Schkolne, S., Pruett, M., and Schröder, P. "Surface drawing: creating organic 3D shapes with the hand and tangible tools". Proc. CHI '01, 261-268.

Sheng, J., Balakrishnan, R., and Singh, K. "An interface for virtual 3d sculpting via physical proxy". Graphite (2006), 213-220.

Smith, R.T., Thomas, B.H., and Piekarski, W. "Digital foam interaction techniques for 3D modeling". VRST '08, 61-68.

Volino, P., Cordier, F., and Magnenat-Thalmann, N. "From early virtual garment simulation to interactive fashion design". Computer-Aided Design, 37:6, May 2005, 593-608.

Wagner, J., Nancel, M., Gustafson, S.G., Huot, S., and Mackay, W.E. "Body-centric design space for multisurface interaction". CHI'13, 1299-1308.

Wang, R., Paris, S., and Popovíc, J. "6D hands: markerless hand-tracking for computer aided design". UIST'11, 549-558.

Weichel, C., Lau, M., Kim, D., Villar, N., and Gellersen, H.W. "MixFab: a mixed-reality environment for personal fabrication". CHI '14, 3855-3864.

Weigel, M., Mehta, V., Steimle, J. "More Than Touch: Understanding How People Use Skin as an Input Surface for Mobile Computing". CHI '14.

Wibowo, A., Sakamoto, D., Mitani, J., and Igarashi, T. "DressUp: a 3D interface for clothing design with a physical mannequin" Proc. TEI '12, 99-102.

Wilson, A. D. "Using a depth camera as a touch sensor". ITS (2010), 69-72.

Yang, X.-D., Grossman, T., Wigdor, D., and Fitzmaurice, G. "Magic finger: always-available input through finger Instrumentation". ACM UIST'12, 147-156.

Zhang. Y., Han, T., Ren, Z., Umetani, N., Tong, X., Liu, Y., Shiratori, T., and Cao, X. "BodyAvatar: creating freeform 3D avatars using first-person body gestures". UIST '13, 387-396.

Zoran, A., Shilkrot, R., and Paradiso, J. (2013) "Human-computer interaction for hybrid carving". UIST '13, 433-440.

(56) References Cited

OTHER PUBLICATIONS

Umetani N., Danny M., Igarashi T., and Grinspun E. "Sensitive couture for interactive garment modeling and editing". ACM Trans. Graph., 30:90:1-90:12, 2011.
Non-final Office Action for U.S. Appl. No. 14/968,661, dated May 21, 2018, 14 pages.

* cited by examiner

SKIN-BASED APPROACH TO VIRTUAL MODELING

CROSS-REFERENCE TO RELATED APPLICATIONS

This application claims the benefit of United States provisional patent application titled "TACTUM: A SKIN-CENTRIC APPROACH TO DIGITAL DESIGN AND FABRICATION," filed on Dec. 15, 2014 and having Ser. No. 62/092,205. The subject matter of this related application is hereby incorporated herein by reference.

BACKGROUND OF THE INVENTION

Field of the Invention

The present invention generally relates to computer science and, more specifically, to a skin-based approach to virtual modeling.

Description of the Related Art

Articles to be worn on the human body (such as clothes and jewelry) may be digitally designed and modeled in a virtual three-dimensional (3D) environment. Articles that are to be worn on the human body are typically designed to have a precise fit with the human body and modeling such articles properly usually involves time consuming, inefficient, and non-intuitive processes. For example, in designing an article intended for a particular human body part, several iterations of a highly complex model of the 3D geometries making up the article may be required. This modeling process typically involves estimating the relevant 3D geometries, fabricating the article based on the estimated 3D geometries, placing the fabricated article on the human body part, and correcting the different 3D geometries based on that placement. Several iterations of this process may be required to produce a satisfactory article that precisely fits the intended body part. The design process also typically involves non-intuitive tools used for generating and modifying the 3D geometries of the article requiring conventional mouse and keyboard input devices. Using such conventional tools are especially difficult for beginner users/designers.

In addition, the time consuming and inefficient iterative process set forth above makes designing and fabricating custom-made articles for individuals impractical. Consequently, many articles are designed with a "one-size-fits-all" approach, where only one size is available for all individuals. In some circumstances, some design variation may be feasible, such as providing different sizes, such as small, medium, and large sizes, for a given article.

As the foregoing illustrates, there is a need for a more effective approach for modeling articles that are to be worn on part of the human body.

SUMMARY OF THE INVENTION

Various embodiments of the invention includes a computer-implemented method for designing an article for a body part. The method includes detecting a first set of contacts between an input tool and an input canvas at a first set of locations on the input canvas, the input canvas comprising the body part. The method also includes determining a first input based on the first set of contacts and the first set of locations. The method further includes, based on the first input, modifying a virtual model of the input canvas to produce a modified virtual model of the input canvas used for designing the article.

Various embodiments of the invention include a computer-implemented method for designing an article for a body part. The method includes detecting a first set of contacts between an input tool and an input canvas at a first set of locations on the input canvas, the input canvas comprising the body part. The method also includes determining a first input based on the first set of contacts and the first set of locations. The method further includes, based on the first input, modifying a virtual model of the article to produce a modified virtual model of the article, the virtual model of the article based on physical geometries of at least part of the input canvas.

At least one advantage of the disclosed technique is that it enables an efficient and intuitive skin-based approach to modeling an article intended to be worn on a body part.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The following description is divided into six sections. Section I describes a virtual environment for modeling an article for a human body part. Section II describes techniques for capturing and processing skin-based inputs. Section III describes techniques for designing an article based on direct manipulation. Section IV describes techniques for designing an article based on generative manipulation. Section V describes techniques for designing an article based on parametric manipulation. Section VI describes different system configurations for the virtual environment.

Section I: Virtual 3D Environment

Figure 1:
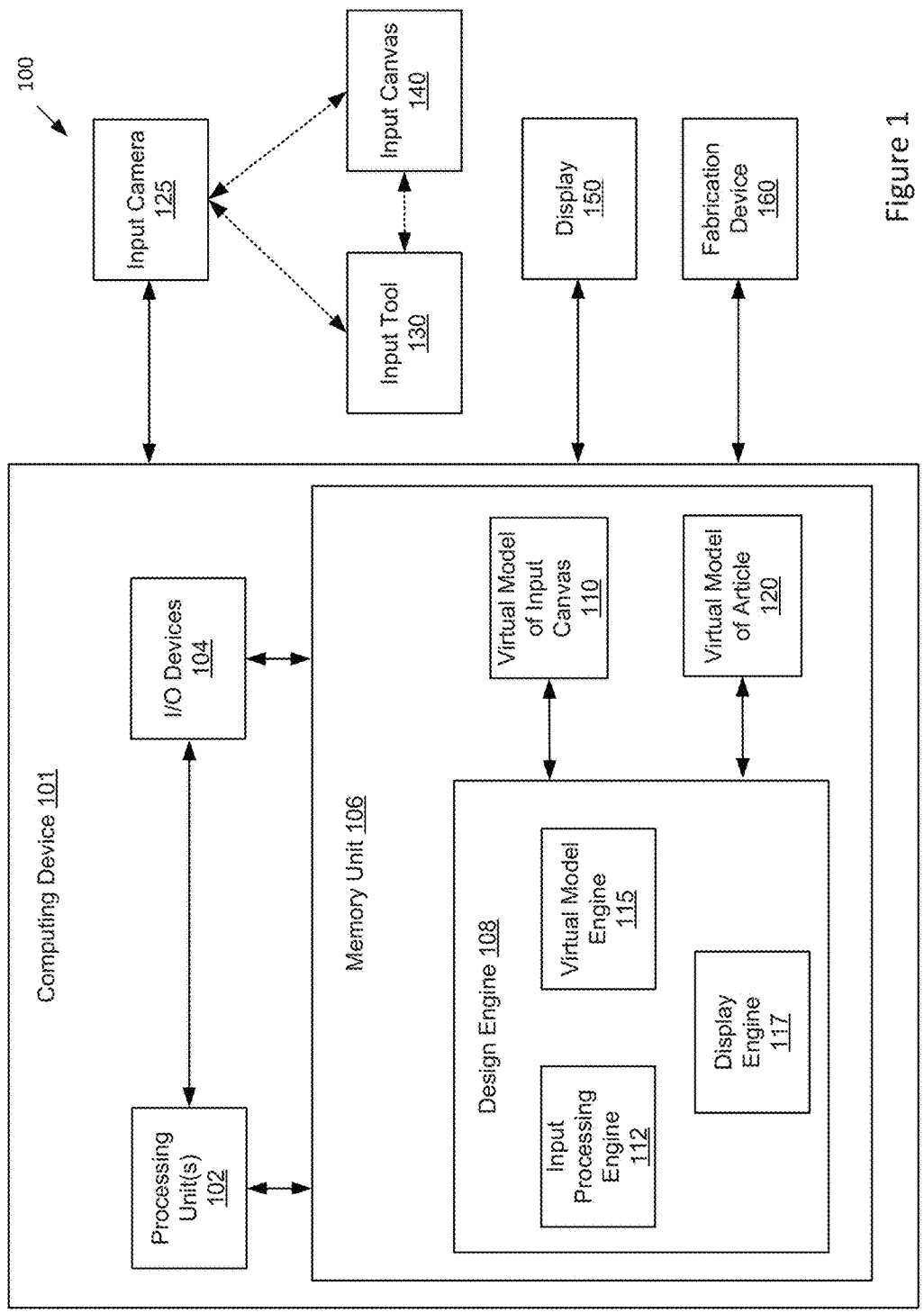
FIG. 1 illustrates a virtual three-dimensional (3D) environment configured to implement one or more aspects of the present invention.

FIG. 1 illustrates a virtual three-dimensional (3D) environment 100 configured to implement one or more aspects of the present invention. The virtual 3D environment 100 comprises an environment for capturing and processing skin-based input gestures for modeling an article for a body part. As shown, the virtual 3D environment 100 includes a computing device 101 comprising a processor 102 coupled to input/output (I/O) devices 104 and to a memory 106. The memory 106 may comprise a design engine 108 (comprising an input processing engine 112, a virtual model engine 115, and a display engine 117), a virtual model of the input canvas 110, and a virtual model of the article 120.

The computing device 101 may comprise a server, personal computer, video game console, personal digital assistant, mobile phone, mobile device or any other device suitable for practicing various embodiments described herein. Processor 102 may be a central processor (CPU), a graphics processor (GPU), or a combination of different processors, such as a CPU configured to operate in conjunction with a GPU. In general, processor 102 may be any technically feasible form of processing device configured process data and execute program code. Processor 102 could be, for example, a central processor (CPU), a graphics processor (GPU), an application-specific integrated circuit (ASIC), a field-programmable gate array (FPGA); and so forth. The processor 102 executes software and performs the functions and operations described herein.

I/O devices 104 are also coupled to memory 106 and may include devices capable of receiving input, such as a keyboard, a mouse, a trackball, and so forth, as well as devices capable of providing output, such as a display, speaker, and so forth. Additionally, I/O devices may include devices capable of both receiving input and providing output, such as a touchscreen, a universal serial bus (USB) port, and so forth. I/O devices 104 may be configured to receive various types of input from an end-user of the virtual 3D environment 100, and to also provide various types of output to the end-user of virtual 3D environment 100. In particular, the I/O devices may further include an input camera 125, input tool 130, input canvas 140, display monitor 150, and a fabrication device 160.

An input tool 130 may comprise, for example, a hand of the user, one or more fingers or fingertips of the user, a stylus, or any other pointing-based tool. An input canvas 140 may comprise any body part, such as the user's forearm, hand, leg, face, back, etc. For the purpose of illustration, the input canvas 140 comprises a forearm in the embodiments described below. However, in other embodiments, the input canvas 140 may comprise any other body part. The input canvas 140 comprises the body part for which the article is intended to be worn. As described herein, the article may be designed using a virtual model that is based on the complex physical geometries/characteristics of the input canvas 140. The virtual model is modified by skin-based gesture inputs comprising contacts/touches between the input tool 130 and the input canvas 140 at various locations on the input canvas 140. Corresponding locations on the virtual model are modified according to the particular gesture inputs to produce a design for the article that is customized for the input canvas 140. Various gesture inputs are described in detail in Section II.

The input camera 125 may comprise a motion sensing input device configured to sense movement of objects in three dimensions and capture 3D video data of the object movement. The input camera 125 may comprise a 3D camera that includes specialized components such as infrared projector, depth camera; RGB or IR optical sensors, depth sensor, monochrome CMOS sensor, and/or specialized microchip(s) to sense 3D motion of objects and capture 3D video data of the objects. The captured 3D video data may include three-dimensional information (e.g., x, y, z coordinates or depth map information) for various locations on the objects. In some embodiments, the input camera 125 is used to 3D scan the input canvas 110 for producing the virtual model of the input canvas 110. The input camera 125 is also used to sense and track the movement of the input tool 130 and input canvas 140 to capture contacts/touches between the input tool 130 and the input canvas 140 at various locations on the input canvas 140. The 3D video data captured by the input camera 125 is received by the input processing engine 112 which detects/determines skin-based gesture inputs from the captured contacts/touches between the between the input tool 130 and the input canvas 140. The input processing engine 112 may determine different types of skin-based gesture inputs based on different types of contacts/touches that are captured and received.

The display monitor 150 may display visual feedback to the user to assist in the design and modeling of the article for the input canvas 140. The visual feedback that is displayed on the display monitor 150 may include images and/or video showing real-time movement of the input tool 130 and input canvas 140, as well as real-time updates/modifications that are made to a virtual model of the input canvas 110 or virtual model of the article 120 (whereby the virtual models dynamically react to received skin-based inputs). In some embodiments, the visual feedback is displayed via a plurality of windows displayed on the display monitor 150, each window showing a particular type of visual feedback. For example, a first window may display real-time modifications made to a virtual model of the input canvas 110 or virtual model of the article 120, a second window may display real-time movement of the input tool 130 and input canvas 140, a third window may display real-time movement of only the input tool 130, a fourth window may display real-time movement of only the input canvas 140, etc.

A fabrication device 160 may comprise any device capable of fabricating/producing the physical article. The design engine 108 may export a virtual model of the article 120 (comprising a 3D printable design) to the fabrication device 160, which produces a physical 3D article based on the virtual model of the article 120. For example, the fabrication device 160 may comprise a 3D printer, fuse-deposition modeling (FDM) printer, stereolithography (SLA) printer, selective laser sintering (SLS) printer, laser cutter, router, or any CNC machine capable of producing physical 3D articles using one or more different materials. For example, materials used to print articles may include ABS plastic, polylactic acid (PLA) plastic, resin, nylon, rubber, or any other suitable material. The fabrication device 160 may use a variety of additive manufacturing technologies to create a 3D article by building it in successive layers until the article is complete.

The article may comprise any item or artifact for wearing on the body, such as jewelry, medical devices, and other wearables items. Several fabrication spaces may specifically benefit from skin-based inputs for digital design, such as fashion items (e.g., garments, shoes, accessories, jewelry, etc.), wearable computing devices (e.g., watches, smart eyewear, fitness trackers, etc.), and medical devices (e.g., braces, splints, casts, etc.). Using techniques described herein, the article will be custom designed to fit the specific complex physical geometries/characteristics of the input canvas 140 (body part) once fabricated.

Memory 106 is configured to store data and may include a hard disk, a random access memory (RAM) module, a flash memory unit, or any other type of memory unit or combination thereof. Processor 102 and I/O devices are configured to read data from and write data to memory 106. Memory 106 includes a design engine 108 (comprising an input processing engine 112, a virtual model engine 115, and a display engine 117), a virtual model of the input canvas 110, and a virtual model of the article 120. The design engine 108 may be implemented using, for example, Java programming language and its open-source libraries (such as processing for graphics, opencv image processing, toxiclibs for physics simulation, etc.). In other embodiments, the design engine 108 may be implemented using other programming languages and/or other libraries.

The virtual model of the input canvas 110 includes a mathematical model of the input canvas 140 and may comprise 3D geometries that represent the physical geometries of the input canvas 140. For example, the virtual model of the input canvas 110 may comprise a polygonal mesh, a point cloud, a wireframe model, or a manifold, etc. However, the virtual model of the input canvas 110 may comprise any type of mathematical model that represents the surface of the input canvas 140 within a three-dimensional (3D) environment. In various embodiments, the virtual model of the input canvas 110 is generated by the design engine 108 based on data received from the input camera 125 (which 3D scans the input canvas 140).

Similarly, the virtual model of the article 120 includes a mathematical model of the article to be worn on the body part (input canvas 140) and may comprise 3D geometries that represent the physical geometries of the article. For example, the virtual model of the article 120 may comprise a polygonal mesh, a point cloud, a wireframe model, or a manifold, etc. However, the virtual model of the article 120 may comprise any type of mathematical model that represents the surface of the article within a three-dimensional (3D) environment. The virtual model of the article 120 may be generated by the design engine 108 based on the virtual model of the input canvas 110.

Design engine 108 is a software application configured to generate and/or modify the virtual model of the input canvas 110 and generate and/or modify the virtual model of the article 120. The design engine 108 may comprise various applications and engines (such as a rendering application/engine, computer-aided design (CAD) application, computer-aided engineering (CAE) application, simulator application, modeler application, geometry generator application, or the like) to perform the functions and operations described herein. Design engine 108 may perform various other operations with the virtual model of the input canvas 110 and the virtual model of the article 120, including texture and color mapping, mesh transformation operations.

The display engine 117 of the design engine 108 may be configured to render pixels that represent the input tool 130, the input canvas 140, the virtual model of the input canvas 110, and/or the virtual model of the article 120 that are displayed on the display monitor 150. The display engine 117 provides to the display monitor 150 images and/or video showing real-time movement of the input tool 130 and input canvas 140, as well as real-time updates/modifications that are made to a virtual model of the input canvas 110 or virtual model of the article 120. The display engine 117 is discussed in further detail in Section II.

The input processing engine 112 of the design engine 108 may be configured to receive 3D video data from the input camera 125, the 3D video data showing movement and interactions between the input tool 130 and the input canvas 140 (such as contacts/touches between the between the input tool 130 and the input canvas 140). The input processing engine 112 may interpret the 3D video data to detect/determine any skin-based gesture inputs from the captured movement and interactions between the input tool 130 and the input canvas 140. In some embodiments, particular types of movement and interactions between the input tool 130 and the input canvas 140 are mapped to predefined gesture inputs. Thus, the input processing engine 112 may determine different types of skin-based gesture inputs based on different types of movement and interactions between the input tool 130 and the input canvas 140 that are captured and received. The input processing engine 112 is discussed in further detail in Section II.

The virtual model engine 115 of the design engine 108 may be configured to modify or process the virtual model of the input canvas 110 and/or the virtual model of the article 120 based on the skin-based gesture inputs detected/determined by the input processing engine 112. As used herein, "modifying" a virtual model of the input canvas based on a gesture input is not equivalent to only navigating the virtual model of the input canvas based on a gesture input (such as changing a view or perspective of the virtual model of the input canvas). As used herein, "modifying" a virtual model of the input canvas based on a gesture input is also not equivalent to only re-scanning the input canvas to provide a current display of the input canvas in response to a gesture input. In these embodiments, "modifying" a virtual model of the input canvas includes operations and functions beyond navigating the virtual model and/or re-scanning of the input canvas. In particular, a "modified" virtual model of the input canvas may comprise geometries and/or parameters that are different than a current real-time scan of the input canvas.

In some embodiments, the virtual model engine 115 implements three different design modes for designing an article based on skin-based gesture inputs. These design modes include a direct manipulation mode, generative manipulation mode, and parametric manipulation mode. The virtual model engine 115 is discussed in further detail in Sections III-V.

In some embodiments, for the direct manipulation and generative manipulation modes, a virtual model of the input canvas 110 is generated and then modified through received skin-based inputs (performed using the input tool 130 and input canvas 140). The modified virtual model of the input canvas 110 is then further processed to produce a virtual model of the article 120. In the direct manipulation mode, the virtual model of the input canvas 110 comprises a malleable virtual model that is modified by skin-based inputs to produce a modified malleable virtual model. The volume of the input canvas 110 may then be subtracted from the modified malleable virtual model to produce the virtual model of the article 120. In the generative manipulation mode, the virtual model of the input canvas 110 comprises a heatmap virtual model that is modified by skin-based inputs to produce a modified heatmap virtual model. A generative algorithm is then applied to the modified heatmap virtual model to generate 3D geometries in the heatmap virtual model to produce the virtual model of the article 120. The direct manipulation mode is described in detail in Section III and the generative manipulation mode is described in detail in Section IV.

For the parametric manipulation mode, a virtual model of the input canvas 110 is generated and a virtual model of the article 120 is then generated based on the virtual model of the input canvas 110. The virtual model of the article 120 is then modified through received skin-based inputs (performed using the input tool 130 and input canvas 140). In some embodiments, the virtual model of the article 120 comprises a parametric model comprising a plurality of parameters that are modifiable by the skin-based inputs. The parametric manipulation mode is described in detail in Section V.

In all three modes, the resulting virtual model of the article 120 is based, at least in part, on the virtual model of the input canvas 110. Therefore, in all three modes, the resulting virtual model of the article 120 is based on the physical geometries of at least part of the input canvas 140 (body part). Also, in all three modes, the resulting virtual model of the article 120 may comprise a 3D digital design of the article that is exportable to the fabrication device 160 for physical fabrication of the article.

Section II: Capturing and Processing Skin-Based Inputs

As described above, the input processing engine 112 may be configured to receive 3D video data (from the input camera 125) showing movement and interactions between the input tool 130 and the input canvas 140 and detect/map skin-based gesture inputs from the captured movement and interactions (referred to herein as an "input-mapping" function). For the input processing engine 112 to perform the input-mapping function, however, the input processing engine 112 should first be enabled to detect contacts/touches between the input tool 130 and the input canvas 140 at various locations on the input canvas 140 (referred to herein as an "contact-detection" function). Thus, the contact-detection function of the input processing engine 112 should first be enabled before executing the input-mapping function of the input processing engine 112.

In some embodiments, the contact-detection function is enabled by generating an input tool mask and an input canvas mask from 3D planes of the input canvas 140. In particular, the input processing engine 112 may execute a 3D scan of the input canvas 140 (using the input camera 125) and generate a virtual model of the input canvas 110 based on the 3D scan. The virtual model of the input canvas 110 may define anatomical regions and contours of the input canvas 140. For example, if the input canvas 140 comprises a forearm, the virtual model of the input canvas 110 may define anatomical regions and contours of the elbow, wrist, hand, fingers, etc.

Figure 2:
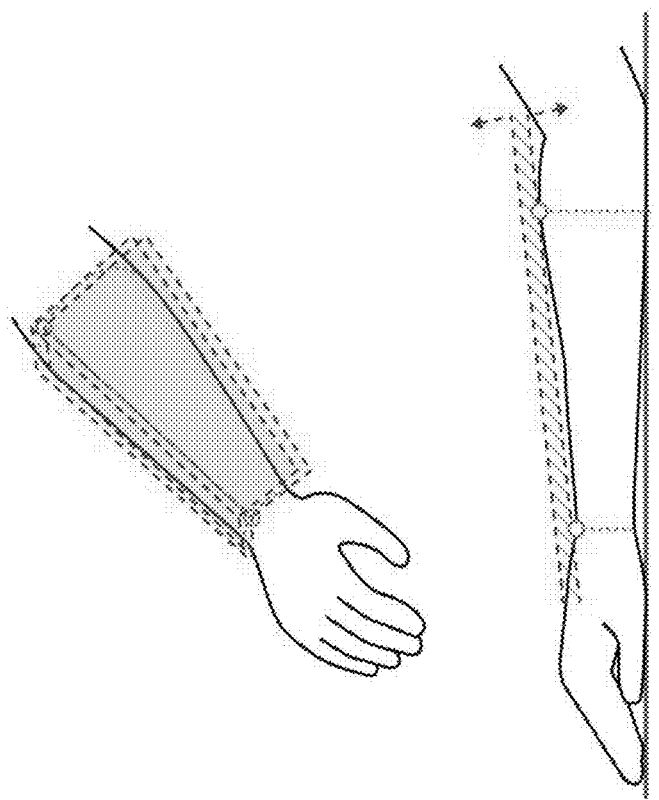
FIG. 2 is a conceptual illustration of 3D planes defined for an input canvas, according to various embodiments of the invention.

The input processing engine 112 then defines at least two slopes comprising different dimensions to simplify the virtual model of input canvas 140 into at least two 3D planes. FIG. 2 is a conceptual illustration of 3D planes defined for an input canvas, according to various embodiments of the invention. In the example of FIG. 2, the input processing engine 112 may define an YZ slope from the elbow to the wrist (shown in the lower image of FIG. 2) and an XZ slope from the middle of the forearm to the side of the forearm (shown in the upper image of FIG. 2).

The at least two 3D planes segment the depth image of the virtual model into an input tool mask and an input canvas mask. All content (captured by the input camera 125) determined to be above the at least two 3D planes becomes part of the input tool mask, and all content determined to be between the at least two 3D planes and a predetermined minimum distance becomes part of the canvas arm mask. To reliably detect skin-based interactions between the input tool 130 and the input canvas 140, adaptions should be made to the three-dimensional geometry of the input canvas 140. For example, the 3D planes used to segment the input tool mask and an input canvas mask may be offset by the predetermined minimal distance (e.g., ~20 mm) so that when the input tool 130 enters a space between the offset distance and 3D planes, the input processing engine 112 may determine that a contact/touch has occurred between the input tool 130 and the input canvas 140. For example, when the input tool 130 is brought within 20 mm of the input canvas it is considered to be in contact with the input canvas. FIG. 2 shows an offset distance (shown by the arrows) from the 3D plane that defines the 3D contact/touch region of the input canvas 140 (e.g., forearm).

Figure 3:
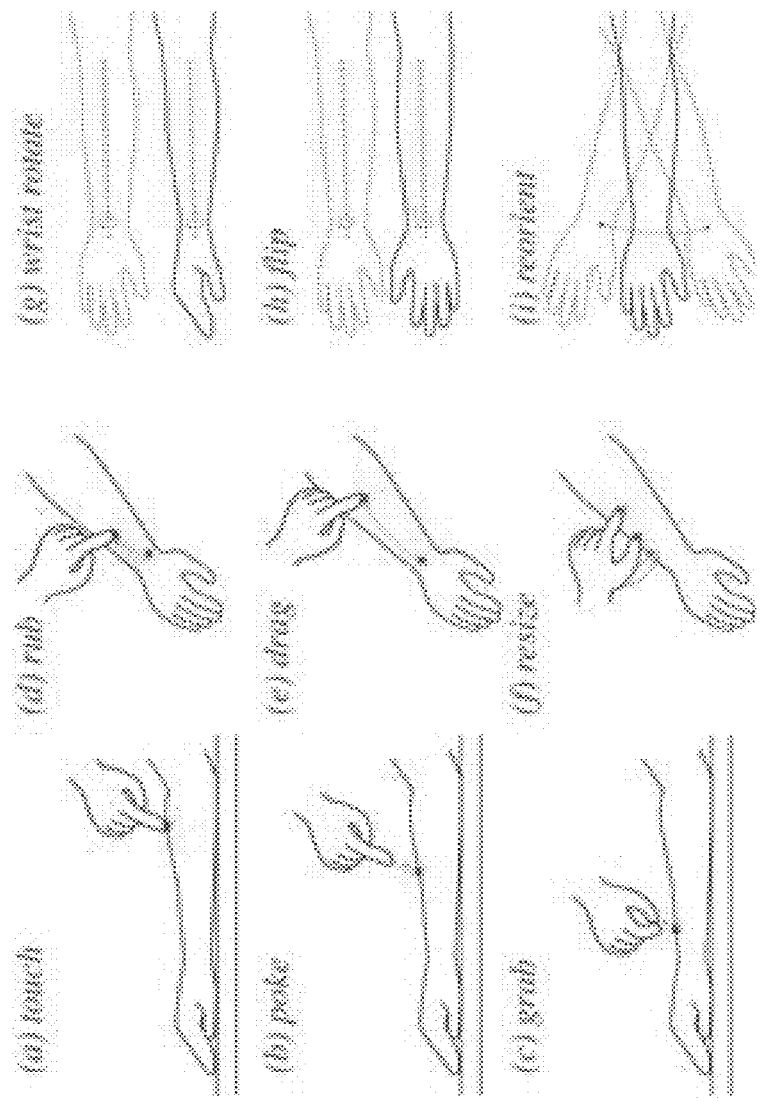
FIG. 3 is a conceptual diagram of a skin-based input set detectable by the input processing engine of FIG. 1, according to various embodiments of the invention.

Once the contact-detection function is enabled, the input processing engine 112 may then map movement and interactions between the input tool 130 and the input canvas 140 to predefined skin-based gesture inputs. FIG. 3 is a conceptual diagram of a skin-based input set detectable by the input processing engine of FIG. 1, according to various embodiments of the invention. FIG. 3 is for exemplary purposes only, and in other embodiments, other skin-based gesture inputs may be detectable by the input processing engine 112.

In some embodiments, a gesture input comprises a single contact/touch between a single point on the input tool 130 and the input canvas 140 at one or more locations on the input canvas 140. For example, a "touch" input (shown as image (a) in FIG. 3) or a "poke" input (shown as image (b) in FIG. 3) may comprise a single contact/touch between a single point on the input tool 130 (e.g., single fingertip) and the input canvas 140 (e.g., forearm) at a single location on the input canvas 140. The poke input and the touch input are similar except that the poke input comprises a brief touch (single tap) between the input tool 130 and the input canvas 140 and the touch input comprises a longer lingering touch between the input tool 130 and the input canvas 140. As another example, a "rub" input (shown as image (d) in FIG. 3) or a "drag" input (shown as image (e) in FIG. 3) may comprise a single contact/touch between a single point on the input tool 130 (e.g., single fingertip) and the input canvas 140 (e.g., forearm) at a range of locations on the input canvas 140. The drag input and the rub input are similar except that the drag input comprises a single movement (single drag) of the input tool 130 across the input canvas 140 and the rub input comprises multiple/repeated movements (multiple drags) of the input tool 130 across the input canvas 140.

In other embodiments, a gesture input comprises multiple contacts ouches between multiple points on the input tool 130 and the input canvas 140 at multiple corresponding locations on the input canvas 140. For example, a "grab" input (shown as image (c) in FIG. 3) or a "resize" input (shown as image (f) in FIG. 3) may comprise two contacts between two points on the input tool 130 (e.g., two fingertips) and the input canvas 140 (e.g., forearm) at multiple corresponding locations on the input canvas 140. The grab input comprises a pinching and pulling of the skin of the input canvas 140 between the thumb and index finger (input tool 130). Whereas, the resize input comprises only a touch and moving of the thumb and index finger (input tool 130) against the skin of the input canvas 140.

Gesture inputs comprising one or more contacts between the input tool 130 and the input canvas 140 may be used for design purposes to modify the virtual model of the input canvas 110 and/or the virtual model of the article 120. In further embodiments, a gesture input may comprise a predefined movement of only the input canvas 140. In these embodiments, gesture inputs requiring the use of the input canvas 140 are not used for modifying a virtual model, but are used for 3D navigation of the virtual model of the input canvas 110 and/or the virtual model of the article 120. For example, a "wrist rotate" input (shown as image (g) in FIG. 3) may comprise a rotation movement of the input canvas 140, a "flip" input (shown as image (h) in FIG. 3) may comprise a flipping movement of the input canvas 140, and a "reorient" input (shown as image (i) in FIG. 3) may comprise a shaking movement of the input canvas 140. The types of gesture inputs may map to various navigation operations that are performed on the input canvas 110 and/or the virtual model of the article 120. For example, the navigation operations may include toggling between orthographic and perspective view, go to predetermined home view, save current view as home view, slow zoom in or zoom out, rotate view, fast zoom in or zoom out, continuous rotation, discrete flip to front/back view, pan/rotate, etc.

In further embodiments, the skin-based gesture inputs may also incorporate individual variations ("landmarks") of the skin of the input canvas 140 (such as freckles, veins, tattoos, etc.) to provide spatial landmarks to anchor a user's spatial and tactile memory when performing gesture inputs on the input canvas 140. These landmarks may provide a persistent reference to skin-based interactions as the user works at a 1:1 scale with the body part comprising the input canvas 140. For example, the user touching a landmark may indicate selection of an application-specific command. To illustrate, a landmark may comprise a freckle, whereby the user touches the freckle to perform an export of the design for fabrication function. An initial calibration step may be used to enable a landmark-based gesture input. For example, the user may first select landmarks by touching the desired landmark points on the input canvas 140, then recording a gesture by dragging their finger to each landmark.

Figure 4:
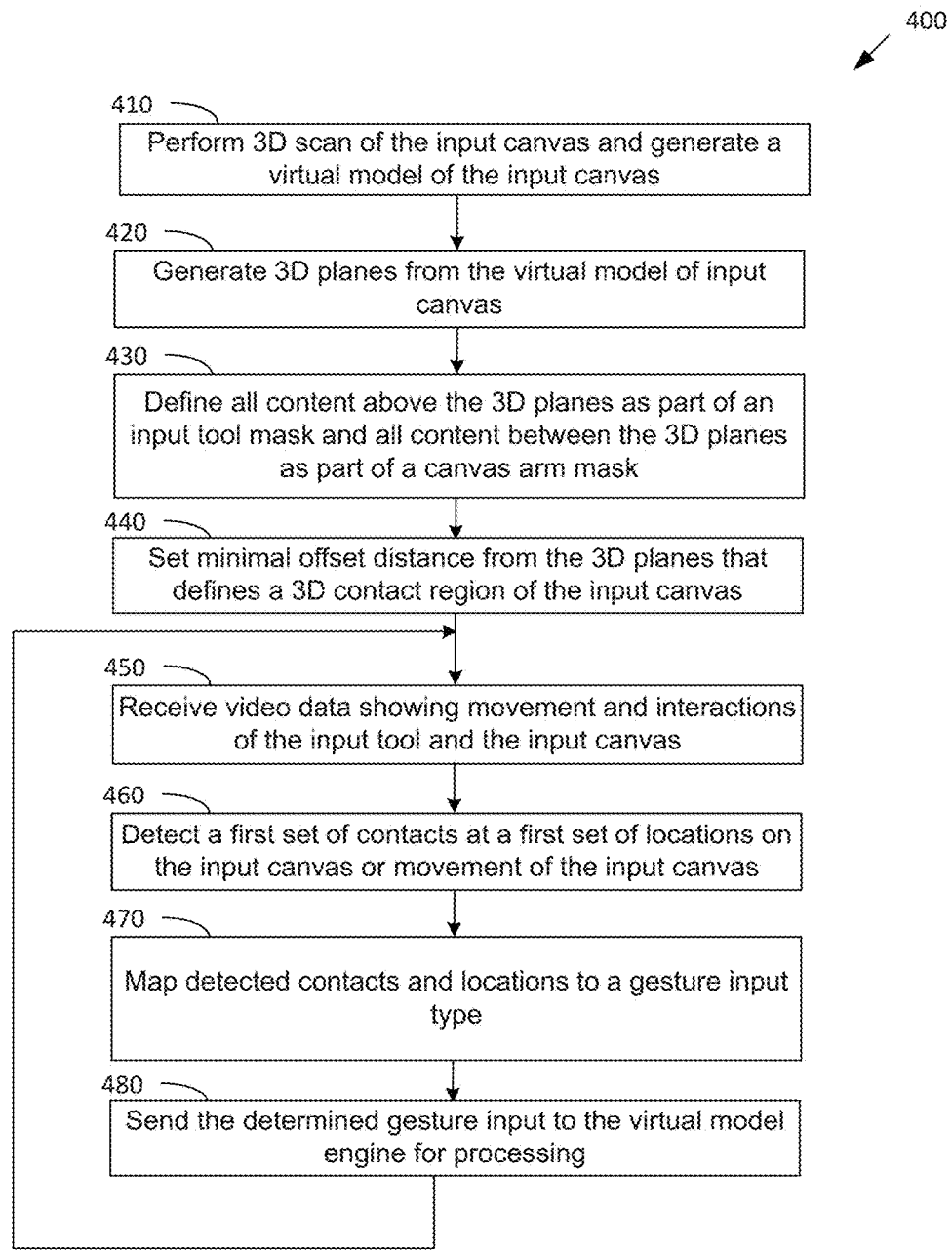
FIG. 4 illustrates a flow diagram of method steps for detecting skin-based gestures in a virtual environment, according to various embodiments of the invention.

FIG. 4 illustrates a flow diagram of method steps for detecting skin-based gestures in a virtual environment, according to various embodiments of the invention. The method 400 of FIG. 4 includes enabling the contact-detection function of the input processing engine 112 and then performing the input-mapping function of the input processing engine 112. Although the method steps are described in conjunction with the systems of FIGS. 1-3, persons skilled in the art will understand that any system configured to perform the method steps, in any order, is within the scope of the invention.

The method 400 begins when the input processing engine 112 performs (at step 410) a 3D scan of the input canvas 140 (using the input camera 125) and generate a virtual model of the input canvas 110 based on the 3D scan. The input processing engine 112 then generates (at step 420) at least two 3D planes from the virtual model of input canvas 140. The input processing engine 112 defines (at step 430) all content (captured by the input camera 125) determined to be above the at least two 3D planes as part of an input tool mask, and all content determined to be between the at least two 3D planes as part of a canvas arm mask. The input processing engine 112 sets (at step 440) a minimal offset distance from the 3D planes that defines a 3D contact/touch region of the input canvas 140 (so that when the input tool 130 enters a space between the offset distance and the 3D planes, the input processing engine 112 may determine that a contact/touch has occurred between the input tool 130 and the input canvas 140).

The input processing engine 112 then receives (at 450) 3D video data from the input camera 125 showing movement and interactions between the input tool 130 and the input canvas 140 and/or movement of only the input canvas 140. The input processing engine 112 then processes (at step 460) the captured movement and interactions to detect a first set of contacts between the input tool 130 and the input canvas 140 at a first set of locations on the input canvas 140 or to detect movement of only the input canvas 140. The input processing engine 112 then maps (at step 470) the detected contacts and locations between the input tool 130 and the input canvas or movement of the input canvas 140 to a predefined gesture input type. Thus, the input processing engine 112 detects/determines a predefined gesture input based on the first set of contacts and the first set of locations or movement of only the input canvas 140. For example, the input processing engine 112 may determine the predefined gesture input using a mapping table that specifies a plurality of different types of interactions between the input tool 130 and the input canvas 140 and movements of the input canvas 140 and a plurality of different types of gesture inputs, each type of interaction or movement mapping to a different type of gesture input. FIG. 3 shows examples of gesture inputs that are detectable by the input processing engine 112.

The input processing engine 112 then sends (at step 480) the determined gesture input to the virtual model engine 115 for processing. The gesture input sent to the virtual model engine 115 also includes the set of locations on the input canvas 140 where the set of contacts occurred. The method 400 continues at step 450 where the input processing engine 112 receives further 3D video data from the input camera 125 for processing. In this manner, the input processing engine 112 continually receives and analyzes movement and interactions between the input tool 130 and the input canvas 140 to detect gesture inputs, and sends the detected gesture inputs to the virtual model engine 115 for processing.

The display engine 117 of the modeling engine 108 may be configured to send a continuous and real-time video stream that represents the input tool 130, the input canvas 140, the virtual model of the input canvas 110, and/or the virtual model of the article 120 to the display monitor 150 for display. In some embodiments, as the input processing engine 112 detects gesture inputs from the movement and interaction of the input tool 130 and the input canvas 140, the display engine 117 simultaneously and continuously provides to the display monitor 150 a video stream for displaying real-time movement of the input tool 130 and input canvas 140.

The display engine 117 may implement various techniques to provide the continuous and real-time video stream to the display monitor 150. For example, the display engine 117 may cause the input camera 125 to continuously 3D scan the input tool 130 and input canvas 140 to provide continuous and real-time display of the movements and interactions of the input tool 130 and input canvas 140. However, this technique may sometimes produce a video stream that is too noisy and incomplete to provide useful visual feedback to the user. Therefore, in some embodiments, the display engine 117 may use a simulated spring-mass system in the virtual environment to provide the video stream. To do so, the display engine 117 may produce a virtual representation of the input canvas 140 using a simulated spring-mass system model. The display engine 117 can then use current real-time scan data from the input camera 125 to update select "particles" in the spring-mass system with a limited number of 3D points at predefined locations on the input canvas 140 (e.g., points from the elbow, wrist, and hand). Thus, the virtual representation of the input canvas 140 is updated at the predefined locations by real-time scan data from the input camera 125. The spring-mass system model may be used to both dampen depth noise from the real-time scan of 3D points and facilitate a smooth displayed motion for the input canvas 140. A similar technique may be used for the input tool 130, whereby the display engine 117 produces a virtual representation of the input tool 130 using a simulated spring-mass system, and uses the input camera 125 to provide real-time scan data for updating 3D points at predefined locations on the input tool 130. For example, modeling the input canvas 140 as a spring-mass system may be implemented using existing libraries for simulating spring-mass systems.

In some embodiments, the display engine 117 sends a video stream to the display monitor 150 for displaying a plurality of windows, each window showing a particular type of visual feedback. For example, a first window may display real-time modifications made to the virtual model of the input canvas 110 or the virtual model of the article 120, a second window may display real-time movement of the input tool 130 and input canvas 140, a third window may display real-time movement of only the input tool 130, a fourth window may display real-time movement of only the input canvas 140, etc.

Section III: Designing an Article Based on Direct Manipulation

As described above, the input processing engine 112 continually receives and analyzes movement and interactions between the input tool 130 and the input canvas 140 to detect gesture inputs, and sends the detected gesture inputs to the virtual model engine 115 for processing. For gesture inputs comprising a set of contacts between the input tool 130 and the input canvas 140 occurred, the gesture input sent to the virtual model engine 115 will also include a set of locations on the input canvas 140 where a set of contacts between the input tool 130 and the input canvas 140 occurred. Gesture inputs comprising a set of contacts between the input tool 130 and the input canvas 140 may be processed by the virtual model engine 115 to modify the virtual model of the input canvas 110 or the virtual model of the article 120. For these types of gesture inputs, the virtual model engine 115 may modify a virtual model in accordance with the gesture input at a set of locations on the virtual model corresponding to the set of locations on the input canvas 140 where the set of contacts occurred. Gesture inputs comprising only a movement of the input canvas 140 may be processed by the virtual model engine 115 to navigate the virtual model of the input canvas 110 or the virtual model of the article 120.

In some embodiments, the virtual model engine 115 implements three different design modes for designing an article based on skin-based gesture inputs. These design modes include a direct manipulation mode (described in this Section III), generative manipulation mode (described in Section IV), and parametric manipulation mode (described in Section V). The virtual model engine 115 may interpret and process received gesture inputs differently depending on the design mode that the virtual model engine 115 is in. For the direct manipulation and generative manipulation modes, the received gesture inputs are used to modify a virtual model of the input canvas 110, which is then used to produce a virtual model of the article 120. For the parametric manipulation mode, the received gesture inputs are used to modify a virtual model of the article 120, which is produced based on a virtual model of the input canvas 110.

In all three design modes, the resulting virtual model of the article 120 is based, at least in part, on the virtual model of the input canvas 110. Therefore, in all three design modes, the resulting virtual model of the article 120 is based on the physical geometries of at least part of the input canvas 140 (body part). Also, in all three modes, the resulting virtual model of the article 120 may comprise a 3D digital design of the article that is exportable to the fabrication device 160 for physical fabrication of the article. Further, in all three design modes, the display engine 117 may be configured to send a continuous and real-time video stream to the display monitor 150 for displaying real-time modifications to the virtual model of the input canvas 110 or the virtual model of the article 120. In these embodiments, as the virtual model engine 115 modifies the virtual model of the input canvas 110 or the virtual model of the article 120 based on the gesture inputs, the display engine 117 simultaneously and continuously provides to the display monitor 150 a video stream for displaying real-time updates/modifications that are made to the virtual model of the input canvas 110 or the virtual model of the article 120.

In general, for the direct manipulation mode, the virtual model engine 115 generates a virtual model of the input canvas 110 and modifies the virtual model in accordance with received skin-based gesture inputs. In the direct manipulation mode, the virtual model of the input canvas 110 comprises a malleable virtual model of the input canvas that is modified by the gesture inputs to produce a modified malleable virtual model of the input canvas. Thus, in direct manipulation mode, the gesture inputs may directly transform the virtual model of the input canvas 110. The volume of the input canvas 110 may then be subtracted from the modified malleable virtual model to produce the virtual model of the article 120, which is exportable to a fabrication device 160 for fabricating the physical article.

The virtual model engine 115 may execute a 3D scan of the input canvas 140 (using the input camera 125) to generate the virtual model of the input canvas 110 based on the 3D scan. The virtual model of the input canvas 110 may comprise a base geometry of the input canvas. The virtual model engine 115 then builds a malleable digital surface on the virtual model of the input canvas 110 to produce a malleable virtual model of the input canvas. The malleable surface of the malleable virtual model corresponds to the skin of the input canvas. For example, to generate the malleable virtual model, standard computer graphics technique may be implemented to generate a surface from a set of input control points. Note that since the malleable virtual model of the input canvas is based on a virtual model of the input canvas, locations (defined by 3D coordinates) on the input canvas 140 that are contacted by the input tool 130 will have corresponding locations (defined by 3D coordinates) on the malleable virtual model of the input canvas.

The virtual model engine 115 also incorporates a plurality of control edges ("rubber bands") into the malleable virtual model of the input canvas, each control edge for modifying the malleable virtual model through gesture inputs. The virtual model engine 115 also incorporates a predetermined elasticity threshold to each control edge. The same elasticity threshold may be assigned to each control edge, or different elasticity thresholds may be assigned to different control edges depending on the location of the control edge in the malleable virtual model. For example, standard surface interpolation algorithms may be used to produce the control edges and elasticity thresholds in the malleable virtual model.

After the virtual model engine 115 generates the malleable virtual model of the input canvas, the virtual model engine 115 may begin receiving and processing user gesture inputs for modifying the malleable virtual model. The user may perform "grab" gesture inputs at locations on the input canvas 140 that correspond to a location on a control edge of the malleable virtual model. In particular, the user may pinch and pull the skin of the input canvas 140 between the thumb and index finger (input tool 130) at locations on the input canvas 140 that correspond to a control edge of the malleable virtual model. Thus, the pulling of the skin on the input canvas 140 corresponds to pulling of the malleable surface of the malleable virtual model.

In response to a received "grab" gesture input, the virtual model engine 115 determines the corresponding location on one of the control edges in the malleable virtual model. Note that if the corresponding location in the malleable virtual model is not on a control edge, the "grab" gesture input is ignored (i.e., is not further processed by the virtual model engine 115). The virtual model engine 115 then determines if the pulling of the "grab" gesture input exceeds the predetermined elasticity threshold of the control edge. If so, the virtual model engine 115 modifies/updates the malleable virtual model based on the pulling of the skin at the contact location on the input canvas 140 to produce a modified malleable virtual model. In particular, the virtual model engine 115 modifies the malleable virtual model to reflect the pulling of the malleable surface at the corresponding location on the control edge. Note that if the pulling of the "grab" gesture input does not exceed the predetermined elasticity threshold, the "grab" gesture input is ignored (i.e., is not further processed by the virtual model engine 115). In some embodiments, only "grab" gesture inputs at locations on a control edge that exceed the elasticity threshold of the control edge cause modifications to be made on the malleable virtual model.

Figure 5:
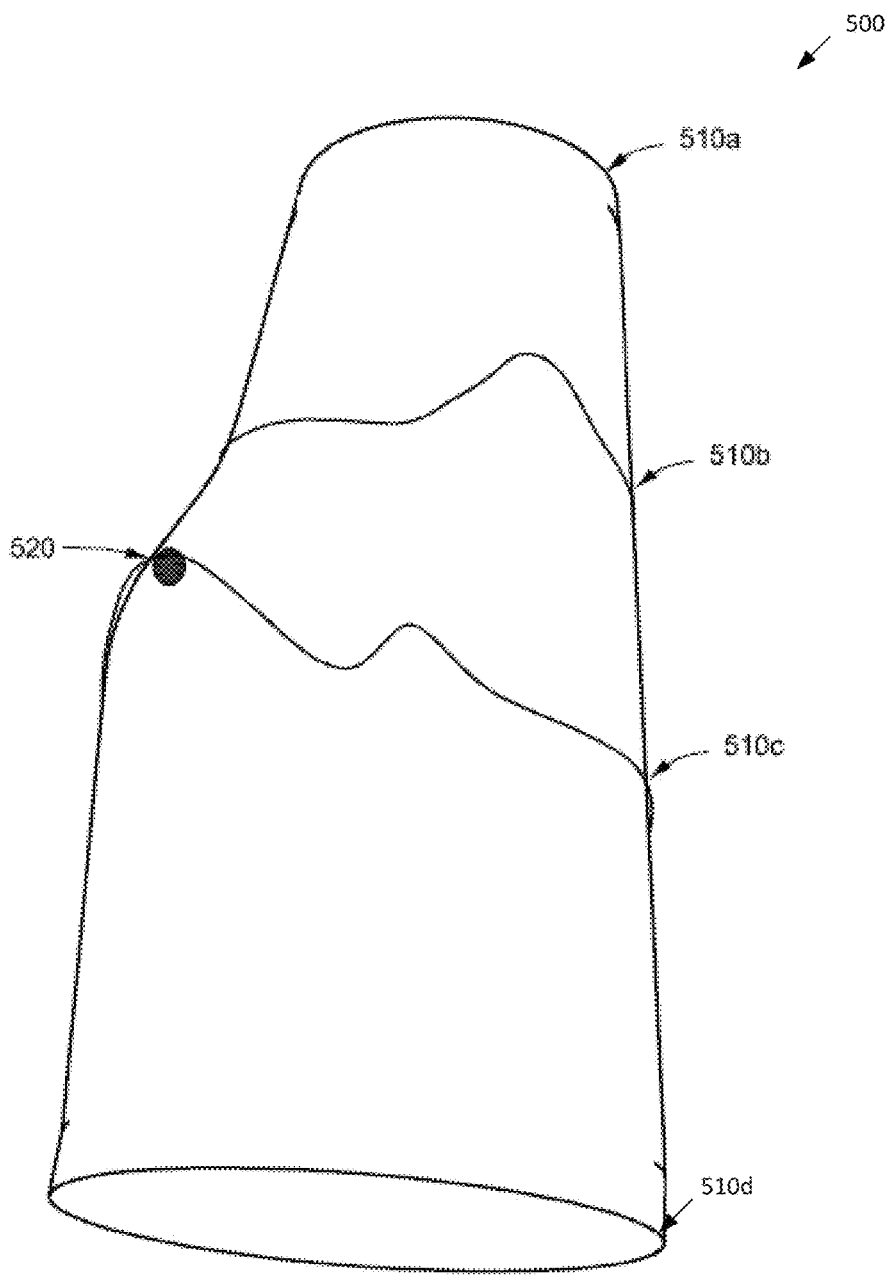
FIG. 5 is a conceptual diagram of a malleable virtual model of the input canvas of FIG. 2, according to various embodiments of the invention.

FIG. 5 is a conceptual diagram of a malleable virtual model of the input canvas of FIG. 2, according to various embodiments of the invention. The intended article is an armlet for the user's forearm which is designed by modifying the malleable virtual model 500 through gesture inputs. As shown, the malleable virtual model 500 includes four control edges 510a-d (although in other embodiments, the malleable virtual model includes a different number of control edges). In the example of FIG. 5, a "grab" gesture input is received and the virtual model engine 115 determines a corresponding location 520 on the third control edge 510c in the malleable virtual model 500. The virtual model engine 115 determines that the pulling of the "grab" gesture input exceeds the predetermined elasticity threshold of the third control edge 510c and thus modifies the malleable virtual model 500 to reflect the pulling of the malleable surface at the corresponding location 520 (as shown by the bump in the malleable virtual model 500).

As the virtual model engine 115 continues to receive and process gesture inputs for modifying the malleable virtual model, the display engine 117 simultaneously and continuously provides to the display monitor 150 a video stream for displaying real-time updates to the malleable virtual model of the input canvas 110. The virtual model engine 115 continues to receive and process user gesture inputs for modifying the malleable virtual model until the virtual model engine 115 receives a "finalize" input from the user indicating that the user has finished modifying the malleable virtual model.

In response to receiving the "finalize" input, the virtual model engine 115 determines the final version of the modified malleable virtual model and produces a virtual model of the article 120 based on the final modified malleable virtual model. In some embodiments, the virtual model engine 115 subtracts the volume of the input canvas 110 from the final modified malleable virtual model to produce the virtual model of the article 120. The virtual model engine 115 then exports the virtual model of the article 120 to a fabrication device 160 for fabricating the physical article.

Figure 6:
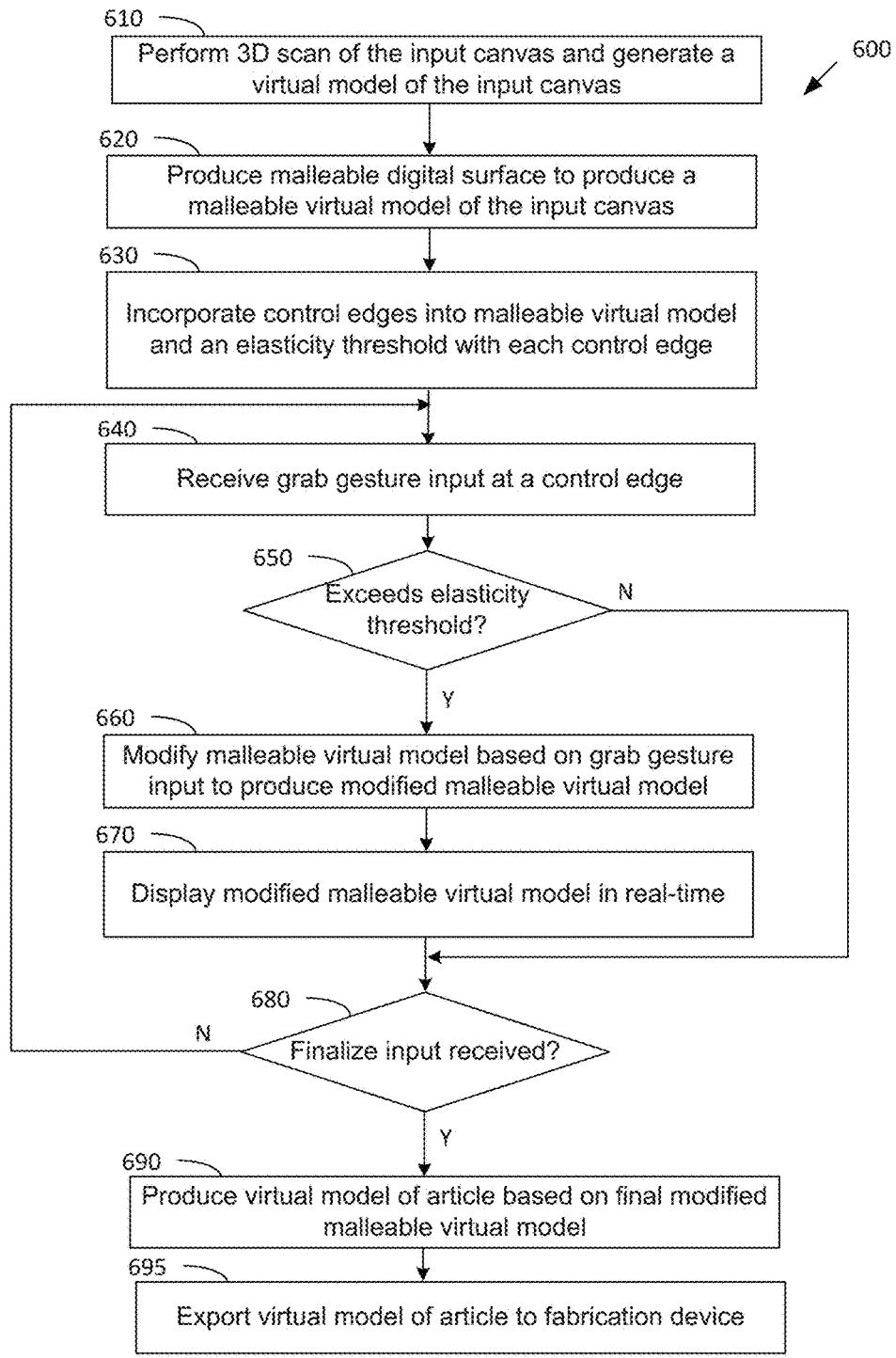
FIG. 6 illustrates a flow diagram of method steps for designing an article via direct manipulation in a virtual environment, according to various embodiments of the invention.

FIG. 6 illustrates a flow diagram of method steps for designing an article based on direct manipulation in a virtual environment, according to various embodiments of the invention. Although the method steps are described in conjunction with the systems of FIGS. 1-3 and 5, persons skilled in the art will understand that any system configured to perform the method steps, in any order, is within the scope of the invention.

The method 600 begins when the virtual model engine 115 performs (at step 610) a 3D scan of the input canvas 160 (using the input camera 125) to generate a virtual model of the input canvas 110. The virtual model engine 115 then builds (at step 620) a malleable digital surface on the virtual model of the input canvas 110 to produce a malleable virtual model of the input canvas. The virtual model engine 115 also incorporates (at step 630) a plurality of control edges into the malleable virtual model and associates a predetermined elasticity threshold with each control edge.

The virtual model engine 115 then receives (at step 640) a gesture input for modifying the malleable virtual model, the gesture input comprising a "grab" gesture input at a location on the input canvas 140 that corresponds to a location on a control edge of the malleable virtual model. In response, the virtual model engine 115 determines (at step 650) if the pulling of the "grab" gesture input exceeds the predetermined elasticity threshold of the control edge. If not, the method 600 continues at step 680. If the "grab" gesture input exceeds the predetermined elasticity threshold of the control edge, the virtual model engine 115 modifies (at step 660) the malleable virtual model based on the received "grab" gesture input to produce a modified malleable virtual model. In particular, the virtual model engine 115 modifies the malleable virtual model to reflect the pulling of the malleable surface at the corresponding location on the control edge. At step 670, the display engine 117 causes the display monitor 150 to display the modified malleable virtual model in real-time.

At step 680, the virtual model engine 115 determines if a "finalize" input is received indicating that the user has finished modifying the malleable virtual model. If not, the method continues at step 640 where the virtual model engine 115 receives another gesture input for modifying the malleable virtual model. If so, the virtual model engine 115 produces (at step 690) the virtual model of the article 120 by subtracting the volume of the input canvas 110 from the final modified malleable virtual model. For example, the virtual model engine 115 may determine the volume of the input canvas 110 by performing a 3D scan of the input canvas 110 using the input camera 125. Subtracting the volume of the input canvas 110 from the final modified malleable virtual model ensures that the resulting article will have an ergonomic fit to the input canvas 140. The virtual model engine 115 then exports (at 695) the virtual model of the article 120 to a fabrication device 160 for fabricating the physical article. The method 600 then ends.

Relative to other design modes, the design mode based on direct manipulation has the advantage of having a higher degree of expressive gestures and the disadvantage of having a lower level of precision control over the final design form of the article.

Section IV: Designing an Article Based on Generative Manipulation

In general, for the generative manipulation mode, the virtual model engine 115 generates a virtual model of the input canvas 110 and modifies the virtual model in accordance with received skin-based gesture inputs. In the generative manipulation mode, the virtual model of the input canvas 110 comprises a heatmap virtual model of the input canvas that is modified by the gesture inputs to produce a modified heatmap virtual model of the input canvas. A generative algorithm is then applied to the modified heatmap virtual model to generate 3D geometries in the heatmap virtual model to produce the virtual model of the article 120, which is exportable to a fabrication device 160 for fabricating the physical article.

The virtual model engine 115 may execute a 3D scan of the input canvas 140 (using the input camera 125) to generate the virtual model of the input canvas 110 based on the 3D scan. The virtual model of the input canvas 110 may comprise a base geometry of the input canvas. The virtual model engine 115 then generates a heatmap surface on the virtual model of the input canvas 110 to produce a heatmap virtual model of the input canvas. For example, to produce the heatmap virtual model from the geometries of the input canvas, a single value (e.g., between 0 and 1) may be associated with each point on the surface of the heatmap virtual model, whereby initially the value at each point may be initialized to "0" (representing black) and the value at each point can be modified upon subsequent user interactions with the input canvas 140.

The heatmap surface of the heatmap virtual model is a touch-sensitive surface that corresponds to the skin of the input canvas. Note that since the heatmap virtual model of the input canvas is based on a virtual model of the input canvas, locations (defined by 3D coordinates) on the input canvas 140 that are contacted by the input tool 130 will have corresponding locations (defined by 3D coordinates) on the heatmap virtual model of the input canvas.

The heatmap virtual model graphically/visually indicates the number of times corresponding locations on the input canvas 140 have been contacted/rubbed by the input tool 130, with higher repetitions being graphically represented as "hotter" locations in the heatmap virtual model. Therefore, locations on the input canvas 140 that have been contacted/rubbed by the input tool 130 with a higher number of repetitions will be graphically shown as "hotter" at the corresponding locations on the heatmap virtual model than locations on the input canvas 140 that have been contacted/rubbed by the input tool 130 with a lower number of repetitions. In these embodiments, locations on the input canvas 140 that have been contacted/rubbed by the input tool 130 a different number of repetitions will have different graphical representations (having different appearances) in the heatmap virtual model. For example, a black and white shading scheme may be used whereby locations on the input canvas 140 that have been contacted/rubbed a lower number of times may be graphically represented by a darker shade and locations on the input canvas 140 that have been contacted/rubbed a higher number of times may be graphically represented by a lighter shade at the corresponding locations in the heatmap virtual model, or vice versa. However, any type of graphics scheme may be used as long as the heatmap virtual model implements different graphical appearances to indicate different numbers of contacts/rubs at various locations on the input canvas 140.

In addition, the virtual model engine 115 may generate and maintain a heatmap table associated with the heatmap virtual model. The heatmap table may store a number of contact/rub repetitions associated with each location on the heatmap virtual model. To generate a graphical representation for each location on the heatmap virtual model, the virtual model engine 115 may retrieve, from the heatmap table, the number of contact/rub repetitions associated with the location and map the number to a particular graphical appearance that is associated with and predefined for that number. Thus, different graphical appearances may be predefined and associated with different numbers of contact/rub repetitions.

After the virtual model engine 115 generates the heatmap virtual model of the input canvas, the virtual model engine 115 may begin receiving and processing user gesture inputs for modifying the heatmap virtual model. The user may perform "rub" gesture inputs at location(s) on the input canvas 140 that correspond to location(s) on the heatmap virtual model. The user may perform more "rub" gesture inputs at locations on the input canvas 140 where the user wishes to have more 3D geometries to be generated, which results in more physical structure and material being formed in those locations in the resulting fabricated article. Thus, the user contacts/rubs the locations on the input canvas 140 that require greater support and structure in the fabricated article.

In response, the virtual model engine 115 modifies the heatmap virtual model based on the received "rub" gesture input to produce a modified heatmap virtual model. In particular, the virtual model engine 115 modifies the graphical appearance of the corresponding location(s) in the heatmap virtual model to reflect the increased number of contacts/rubs that have been performed at the location(s) in accordance with the received "rub" gesture input. For example, the virtual model engine 115 may retrieve, from the heatmap table, the number of repetitions for the corresponding location(s), increase the number of repetitions for the corresponding location(s), and then map the resulting increased number to a new graphical appearance that is associated with and predefined for the resulting increased number.

Figure 7:
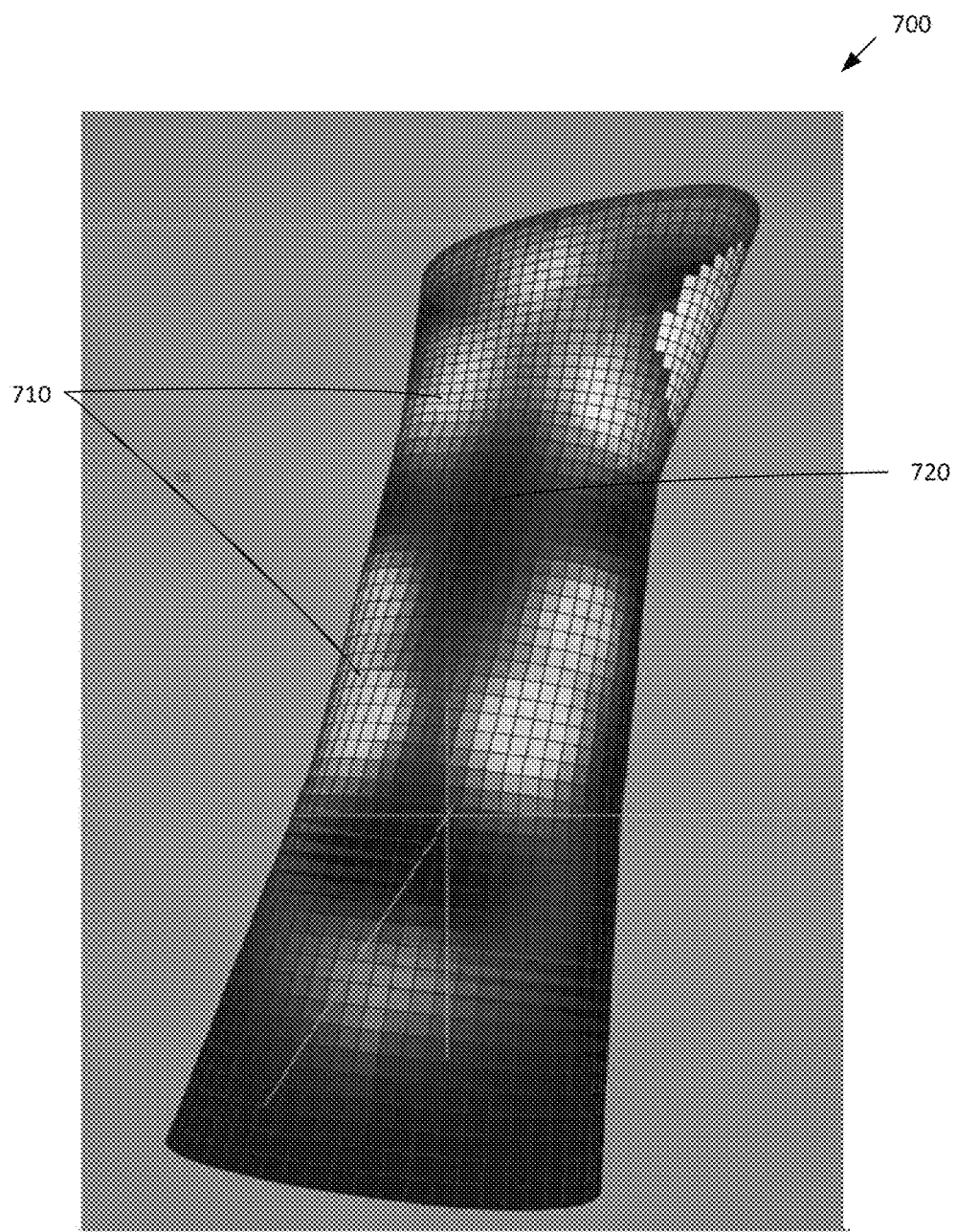
FIG. 7 is a conceptual diagram of a heatmap virtual model of the input canvas of FIG. 2, according to various embodiments of the invention.

FIG. 7 is a conceptual diagram of a heatmap virtual model of the input canvas of FIG. 2, according to various embodiments of the invention. The intended article is a medical brace for the user's forearm which is designed by modifying the heatmap virtual model 700 through gesture inputs. As shown, the heatmap virtual model 700 implements a black and white shading scheme whereby locations on the input canvas 140 that have been contacted/rubbed a relatively lower number of times ("cooler" locations) are graphically represented by a darker shade and locations on the input canvas 140 that have been contacted/rubbed a relatively higher number of times ("hotter" locations) is graphically represented by a lighter shade in the heatmap virtual model 700. Therefore, the lighter locations 710 in heatmap virtual model 700 have received a higher number of contacts/rubs than the darker locations 720 in heatmap virtual model 700, the lighter the location indicating a higher number of contacts/rubs.

As the virtual model engine 115 continues to receive and process gesture inputs for modifying the heatmap virtual model, the display engine 117 simultaneously and continuously provides to the display monitor 150 a video stream for displaying real-time updates to the heatmap virtual model of the input canvas 110. The virtual model engine 115 continues to receive and process user gesture inputs for modifying the heatmap virtual until the virtual model engine 115 receives a "finalize" input from the user indicating that the user has finished modifying the heatmap virtual model.

In response to receiving the "finalize" input, the virtual model engine 115 determines the final version of the modified heatmap virtual model and produces a virtual model of the article 120 based on the final modified heatmap virtual model. The virtual model engine 115 produces the virtual model of the article 120 by building 3D geometries into the final modified heatmap virtual model based on the graphical heat indications at locations on the heatmap virtual model (representing relative numbers of contacts/rubs at the locations). Thus, the 3D geometries generated based on the final modified heatmap virtual model comprises the virtual model of the article 120, which is exportable to a fabrication device 160 for fabricating the physical article.

In some embodiments, the virtual model engine 115 produces the virtual model of the article 120 by applying a generative algorithm to the modified heatmap virtual model which generates 3D geometries based on the heatmap virtual model. For example, the generative algorithm may implement an agent-based model (ABM) to generate 3D geometries based on the heatmap virtual model. Agent-based models are used for simulating actions and interactions of autonomous agents and may comprise a microscale model that simulates the simultaneous operations and interactions of multiple agents. Most agent-based models are composed of: (1) numerous agents specified at various scales (agent-granularity); (2) decision-making heuristics; (3) learning rules or adaptive processes; (4) an interaction topology; and (5) a non-agent environment.

For example, the generative algorithm may implement a plurality of virtual agents comprising Braitenberg vehicles that traverse the surface of the heatmap virtual model to seek out "hot" locations (that received relatively more contacts/rubs) and to avoid "cool" locations (that received relatively fewer contacts/rubs) on the heatmap virtual model. As the Braitenberg vehicles move across the surface of the heatmap virtual model, trails left behind each vehicle are used as the 3D geometries that form the virtual model of the article 120. In addition, the Braitenberg vehicles perform more traversing iterations at the "hot" locations compared to the "cool" locations on the heatmap virtual model. In other embodiments, the generative algorithm may implement other types of agent-based modeling other than Braitenberg vehicles to generate 3D geometries. For example, another algorithm that may be used include a Boids model comprising an artificial life simulation that simulates the flocking behavior of birds, whereby the complexity of Boids arises from the interaction of individual agents (the boids) adhering to a set of rules (such as separation, alignment, and cohesion). For example, another algorithm that may be used include a swarm intelligence model that simulates the collective behavior of decentralized, self-organized systems, natural or artificial. A swarm intelligence system typically comprises a population of simple agents or boids interacting locally with one another and with their environment, whereby the agents follow a set of simple rules. Examples of swarm intelligence systems include ant colonies, bird flocking, animal herding, bacterial growth, fish schooling and microbial intelligence.

Figure 8:
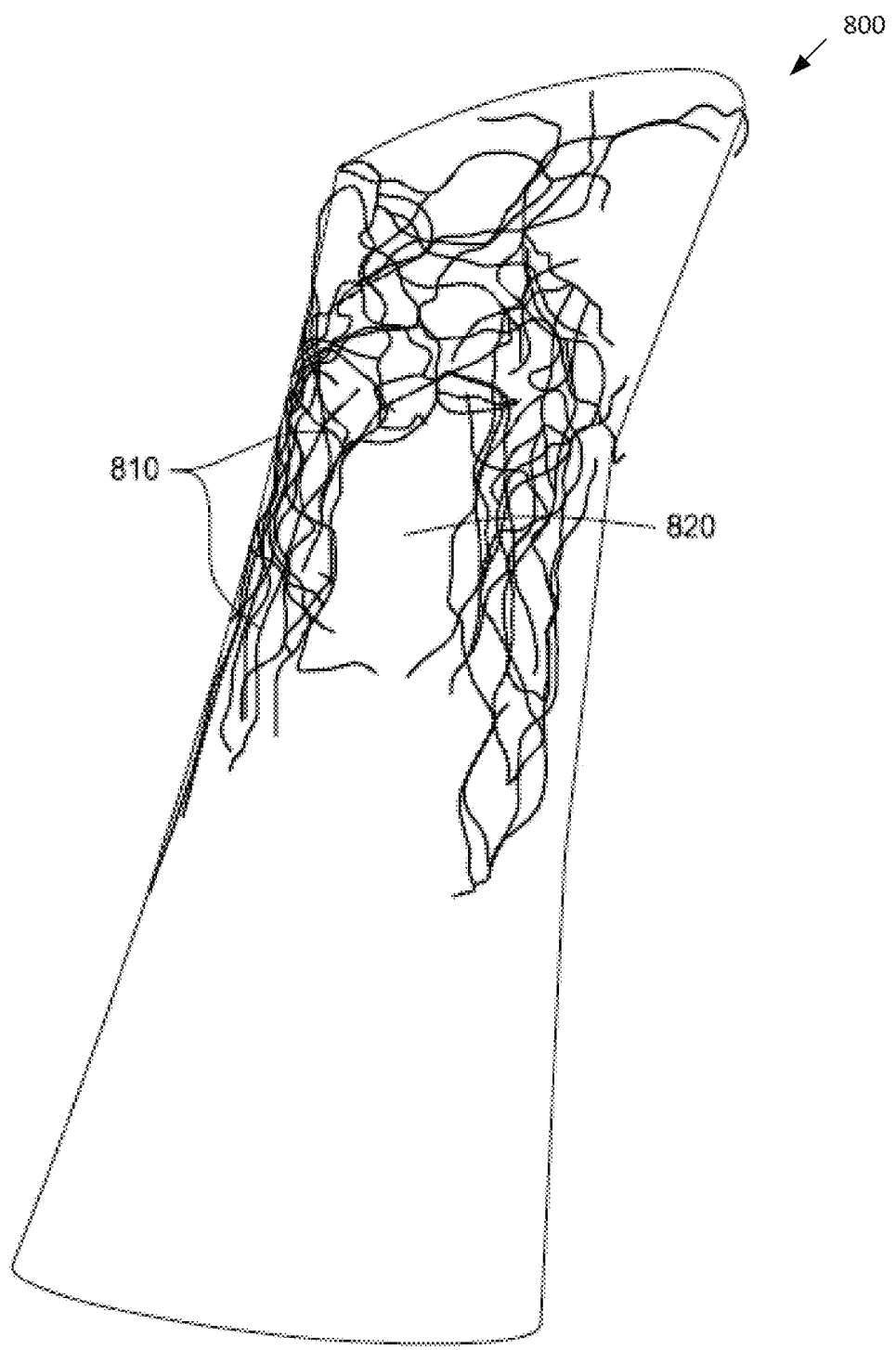
FIG. 8 is a conceptual diagram of a virtual model of an article generated based on the heatmap virtual model of FIG. 7, according to various embodiments of the invention.

FIG. 8 is a conceptual diagram of a virtual model of the article 800 generated based on the heatmap virtual model 700 of FIG. 7, according to various embodiments of the invention. As shown, the virtual model engine 115 produces the virtual model of the article 800 by applying a generate algorithm that generates more 3D geometries at the "hotter" locations 810 (the lighter shaded locations 710 in FIG. 7) which received a relatively higher number of contacts/rubs than the "cooler" locations 820 (the darker shaded locations 720 in FIG. 7) which received a relatively lower number of contacts/rubs. Therefore, the "hotter" locations 810 in virtual model of the article 800 having relatively more generated 3D geometries will result in relatively more physical structure and material being formed at the "hotter" locations 810 than at the "cooler" locations 820 in the fabricated article.

Figure 9:
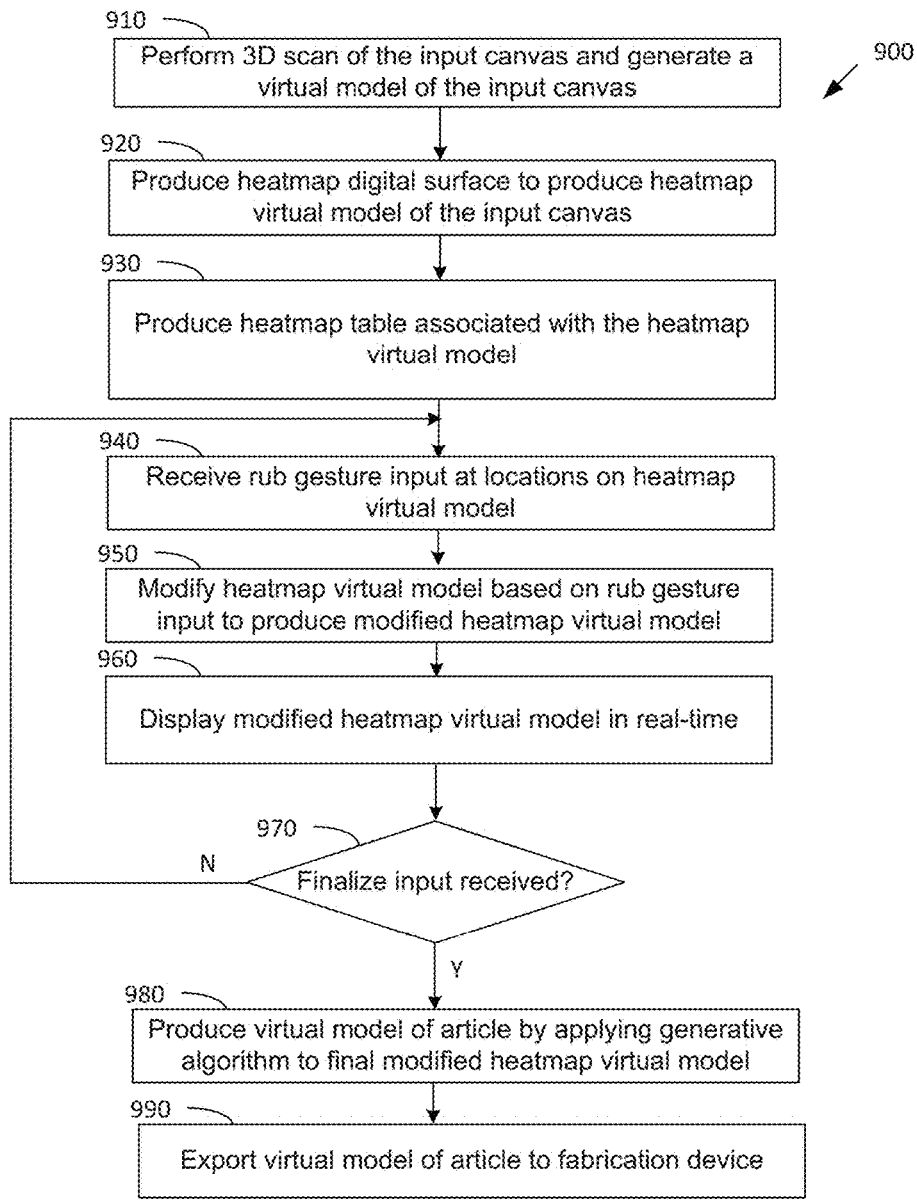
FIG. 9 illustrates a flow diagram of method steps for designing an article via generative manipulation in a virtual environment, according to various embodiments of the invention.

FIG. 9 illustrates a flow diagram of method steps for designing an article based on generative manipulation in a virtual environment, according to various embodiments of the invention. Although the method steps are described in conjunction with the systems of FIGS. 1-3 and 7-8, persons skilled in the art will understand that any system configured to perform the method steps, in any order, is within the scope of the invention.

The method 900 begins when the virtual model engine 115 performs (at step 910) a 3D scan of the input canvas 190 (using the input camera 125) to generate a virtual model of the input canvas 110. The virtual model engine 115 then builds (at step 920) a heatmap digital surface on the virtual model of the input canvas 110 to produce a heatmap virtual model of the input canvas. The virtual model engine 115 also produces (at step 930) a heatmap table associated with the heatmap virtual model to track and record a number of contact/rub repetitions associated with each location on the heatmap virtual model.

The virtual model engine 115 then receives (at step 940) a gesture input for modifying the heatmap virtual model, the gesture input comprising a "rub" gesture input at location(s) on the input canvas 140 that corresponds to location(s) on the heatmap virtual model. In response, the virtual model engine 115 modifies (at step 950) the heatmap virtual model based on the received "rub" gesture input to produce a modified heatmap virtual model. In particular, the virtual model engine 115 modifies the graphical appearance of the corresponding location(s) in the heatmap virtual model to reflect the increased number of contacts/rubs that have been performed at the location(s) in accordance with the received "rub" gesture input, for example, using the heatmap table. At step 960, the display engine 117 causes the display monitor 150 to display the modified heatmap virtual model in real-time.

At step 970, the virtual model engine 115 determines if a "finalize" input is received indicating that the user has finished modifying the heatmap virtual model. If not, the method continues at step 940 where the virtual model engine 115 receives another gesture input for modifying the heatmap virtual model. If so, the virtual model engine 115 produces (at step 980) the virtual model of the article 120 by applying a generative algorithm to the final modified heatmap virtual model which generates 3D geometries based on the final modified heatmap virtual model. The generated 3D geometries comprises the virtual model of the article 120. The virtual model engine 115 then exports (at 990) the virtual model of the article 120 to a fabrication device 190 for fabricating the physical article. The method 900 then ends.

Relative to the other design modes, the design mode based on generative manipulation has the advantage of having a higher degree of expressive gestures and the disadvantage of having a lower level of precision control over the final design form of the article.

Section V: Designing an Article Based on Parametric Manipulation

In general, for the parametric manipulation mode, a virtual model of the input canvas 110 is generated and a virtual model of the article 120 is then generated based on the virtual model of the input canvas 110. In some embodiments, the virtual model of the article 120 comprises a parametric model comprising a plurality of parameters that are modifiable by the skin-based inputs. The parametric virtual model of the article 120 is then modified through received skin-based inputs that modify the parameters of the parametric model. The final modified parametric virtual model of the article 120 is then exportable to a fabrication device 160 for fabricating the physical article.

The virtual model engine 115 may execute a 3D scan of the input canvas 140 (using the input camera 125) to generate the virtual model of the input canvas 110. The virtual model of the input canvas 110 may comprise a base geometry of the input canvas. The virtual model engine 115 then produces a virtual model of the article 120 (comprising a parametric model) based on the virtual model of the input canvas 110. Note that since the parametric virtual model of the article is based on a virtual model of the input canvas 110, locations (defined by 3D coordinates) on the input canvas 140 that are contacted by the input tool 130 will have corresponding locations (defined by 3D coordinates) on the parametric virtual model of the article. Also, since the parametric virtual model of the article is based on a virtual model of the input canvas 110, the parametric virtual model of the article is based on the physical geometries of at least part of the input canvas.

The virtual model engine 115 may produce the parametric virtual model by first generating a 3D surface based on the virtual model of the input canvas 110. In some embodiments, the 3D surface is based on physical geometries of at least part of the input canvas. The virtual model engine 115 then subdivides the 3D surface into a plurality of 3D planes. The virtual model engine 115 then positions a preconfigured interactive module on each 3D plane. Each interactive module may comprise a plurality of parameters with preconfigured default values that are modifiable by gesture inputs. For example, each module may have the modifiable parameters of height, width, thickness, rotation, fillet radius, etc. In other embodiments, other modifiable parameters may be implemented for each module.

In some embodiments, each interactive module is programmed as a pyramid with springs along each edge of the pyramid and a repelling particle at the top of the pyramid. The springs enable the interactive module to sway as it is manipulated in the virtual environment and the repelling particle may prevent each interactive module from intersecting with its neighboring interactive module. For example, a physics-based simulation may be used to control the geometry of each interactive module. The springs (placed along the edge of each pyramid) may restrict the forces that can be applied on the top point ("tip") of the pyramid. In the physics simulation, the top point of the pyramid may act as a repelling particle, so that adjacent neighboring pyramids do not intersect one another. The physics simulation with these types of elastics and repellents may create a swaying effect on each interactive module.

The virtual model engine 115 then connects the plurality of interactive modules to produce a closed mesh of interactive modules comprising the parametric virtual model of the article. In some embodiments, the virtual model engine 115 creates the closed mesh by connecting each interactive module to its neighboring interactive modules at its base, then connects the edges of the interactive modules to the base surface. The closed mesh of connected interactive modules comprises the parametric virtual model of the article. In some embodiments, each interactive module may be pre-designed by an expert designer. In these embodiments, the parametric virtual model of the article comprises a pre-designed virtual model of the article that is modifiable by a user.

Figure 10:
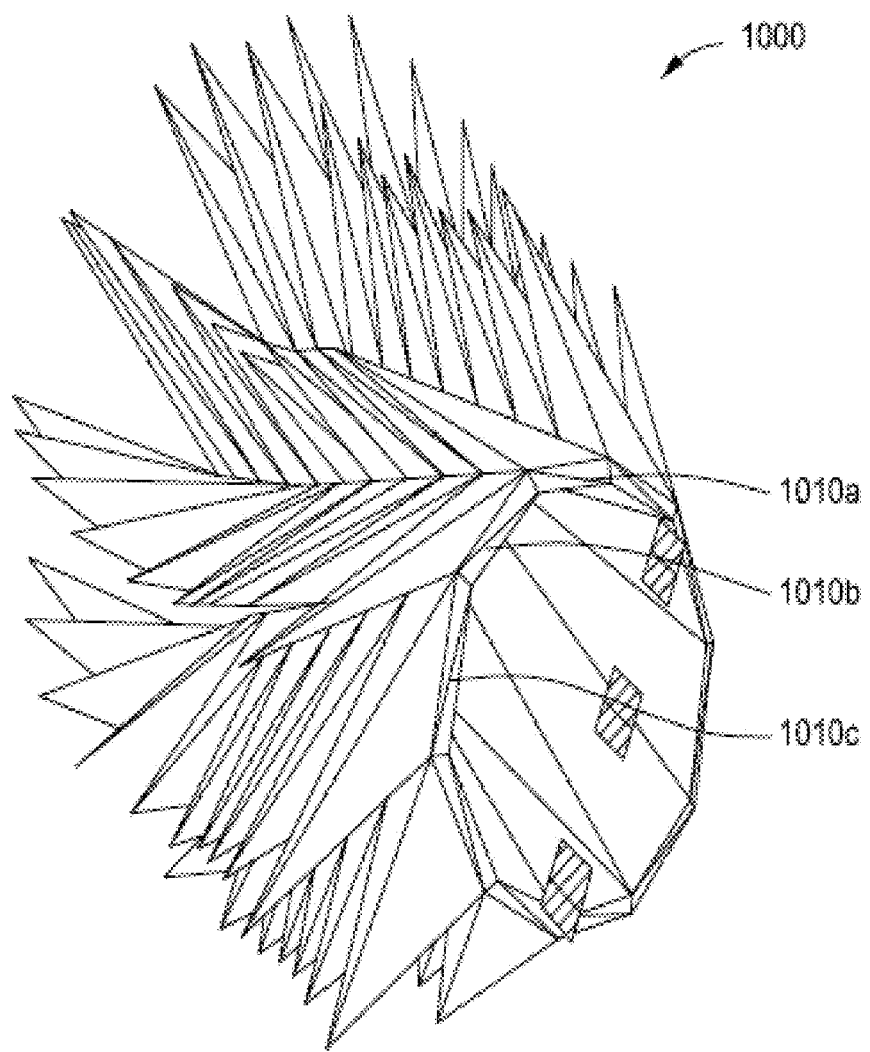
FIG. 10 is a conceptual diagram of a parametric virtual model of an article, according to various embodiments of the invention.

FIG. 10 is a conceptual diagram of a parametric virtual model of an article 1000, according to various embodiments of the invention. The intended article is a piece of jewelry (comprising a cylindrical shape) for the user's forearm which is designed by modifying the parametric virtual model 1000 through gesture inputs. As shown, the parametric virtual model 1000 comprises a closed mesh of a plurality of connected interactive modules 1010a-c (each interactive module shown as a spike or pyramid).

After the virtual model engine 115 generates the parametric virtual model of the article, the virtual model engine 115 may begin receiving and processing user gesture inputs for modifying the parametric virtual model. The user may perform various gesture inputs at location(s) on the input canvas 140 that correspond to location(s) on the parametric virtual model. In response to receiving a gesture input, the virtual model engine 115 modifies the parametric virtual model based on the gesture input to produce a modified parametric virtual model. In particular, the virtual model engine 115 modifies one or more parameters of the parametric virtual model based on the type of gesture input received and the corresponding location on the parametric virtual model.

Examples of gesture inputs that may be received involving contacts between the input tool 112 and input canvas 140 include a "touch" input, "rub" input, "poke" input, and "resize" input. For example, when receiving a "touch" input at a location on the input canvas 140, the virtual model engine 115 may modify the parametric virtual model by pulling in/retracting each interactive module towards the corresponding location on the parametric virtual model. When receiving a "rub" input at a location on the input canvas 140, the virtual model engine 115 may modify the parametric virtual model by elongating/extending each interactive module away from the corresponding location on the parametric virtual model. When receiving a "poke" input at a location on the input canvas 140, the virtual model engine 115 may modify the parametric virtual model by agitating each interactive module at the corresponding location on the parametric virtual model (i.e., re-positioning the 3D position of the "tip" of the pyramid of the interactive module). When receiving a "resize" input at a location on the input canvas 140, the virtual model engine 115 may modify the parametric virtual model by scaling and positioning the parametric virtual model based on the corresponding location on the parametric virtual model.

Examples of gesture inputs that may be received involving only movement of the input canvas 140 include a "reorient" input and "flip" input. For example, when receiving a "reorient" input, the virtual model engine 115 may modify the parametric virtual model by disrupting all interactive modules of the parametric virtual model (i.e., reposition all "tips" of the pyramids of all interactive module by a value proportional to the movement vector of the input canvas). When receiving a "flip" input, the virtual model engine 115 may suspend (put on hold) the design process.

As the virtual model engine 115 continues to receive and process gesture inputs for modifying the parametric virtual model, the display engine 117 simultaneously and continuously provides to the display monitor 150 a video stream for displaying real-time updates to the parametric virtual model of the article 110. The virtual model engine 115 continues to receive and process user gesture inputs for modifying the parametric virtual model until the virtual model engine 115 receives a "finalize" input from the user indicating that the user has finished modifying the parametric virtual model. In response to receiving the "finalize" input, the virtual model engine 115 determines the final version of the modified parametric virtual model and exports the final modified parametric virtual model to a fabrication device 160 for fabricating the physical article.

Figure 11:
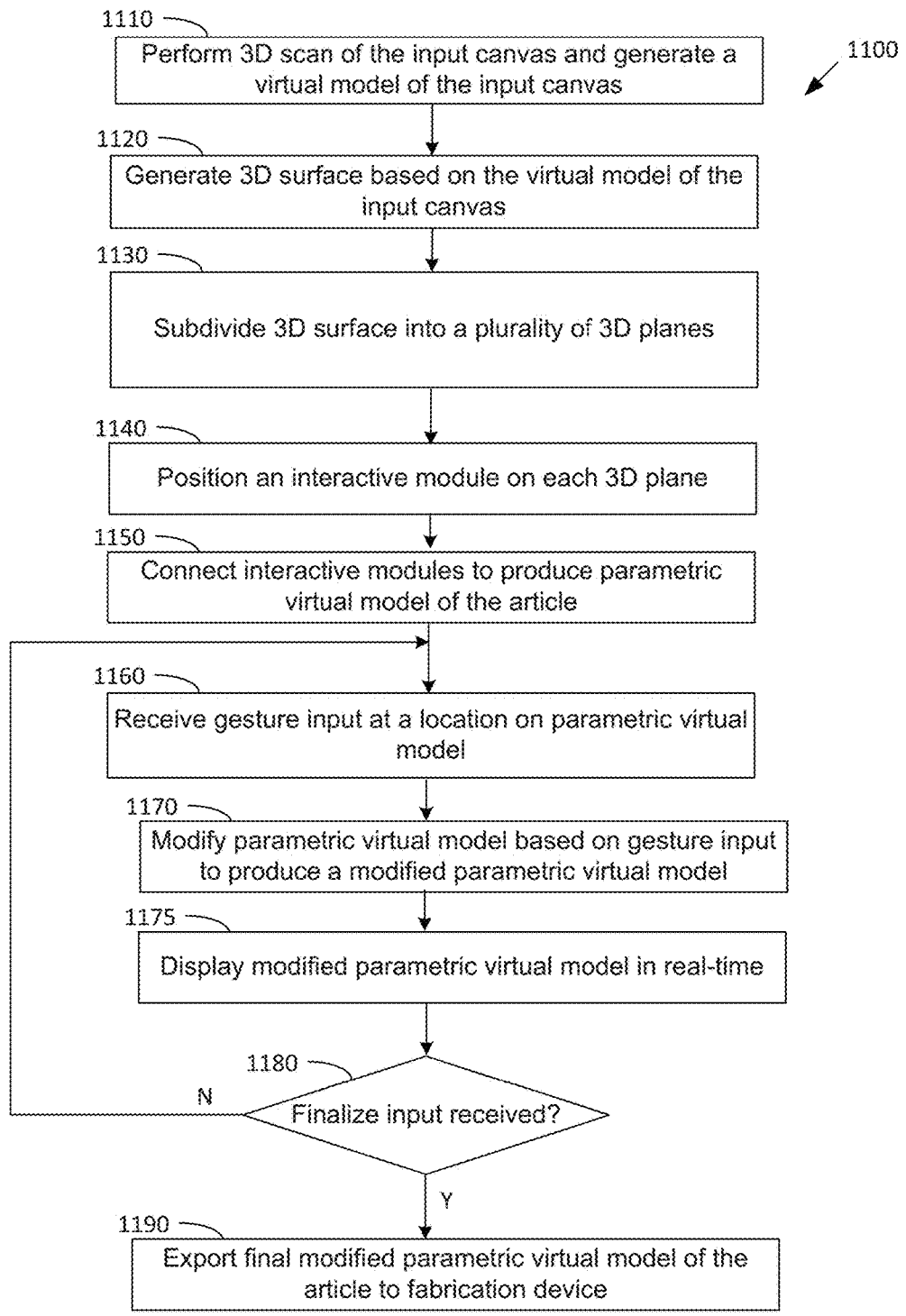
FIG. 11 illustrates a flow diagram of method steps for designing an article via parametric manipulation in a virtual environment, according to various embodiments of the invention.

FIG. 11 illustrates a flow diagram of method steps for designing an article based on parametric manipulation in a virtual environment, according to various embodiments of the invention. Although the method steps are described in conjunction with the systems of FIGS. 1-3 and 10, persons skilled in the art will understand that any system configured to perform the method steps, in any order, is within the scope of the invention.

The method 1100 begins when the virtual model engine 115 performs (at step 1110) a 3D scan of the input canvas 1110 (using the input camera 125) to generate a virtual model of the input canvas 110. The virtual model engine 115 then generates (at step 1120) a 3D surface based on the virtual model of the input canvas 110. The virtual model engine 115 then subdivides (at step 1130) the 3D surface into a plurality of 3D planes. The virtual model engine 115 positions (at step 1140) an interactive module on each 3D plane, each interactive module comprising a plurality of parameters modifiable by gesture inputs. The virtual model engine 115 then connects (at step 1150) the plurality of interactive modules, the parametric virtual model of the article comprising a closed mesh of the connected interactive modules.

The virtual model engine 115 then receives (at step 1160) a gesture input for modifying the parametric virtual model, the gesture input performed at a location on the input canvas 140 that corresponds to a location on the parametric virtual model. In response, the virtual model engine 115 modifies (at step 1170) the parametric virtual model based on the received gesture input to produce a modified parametric virtual model. In particular, the virtual model engine 115 modifies one or more parameters of the parametric virtual model based on the type of gesture input received and the corresponding location on the parametric virtual model. At step 1175, the display engine 117 causes the display monitor 150 to display the modified parametric virtual model in real-time.

At step 1180, the virtual model engine 115 determines if a "finalize" input is received indicating that the user has finished modifying the parametric virtual model. If not, the method continues at step 1160 where the virtual model engine 115 receives another gesture input for modifying the parametric virtual model. If so, the virtual model engine 115 determines and exports (at step 1190) the final modified parametric virtual model of the article to a fabrication device for fabricating the physical article. The method 1100 then ends.

Relative to other design modes, the design mode based on parametric manipulation has the advantage of a higher level of precision control over the final design form of the article and the disadvantage of having a lower degree of expressive gestures. Also, since the design process begins with a parametric virtual model of the article that is a predesigned virtual model of an article, the final designed article will typically have an acceptable form and appearance.

Section VI: Different System Configurations

This section describes different system configurations that may be implemented for designing an article in a virtual environment. In some embodiments, a system configuration may be determined by various factors including the user's point-of-view (input canvas being a body part of the user), the location of the canvas area 140 relative to the user's body, and a number of users interacting with the system.

Figure 12:
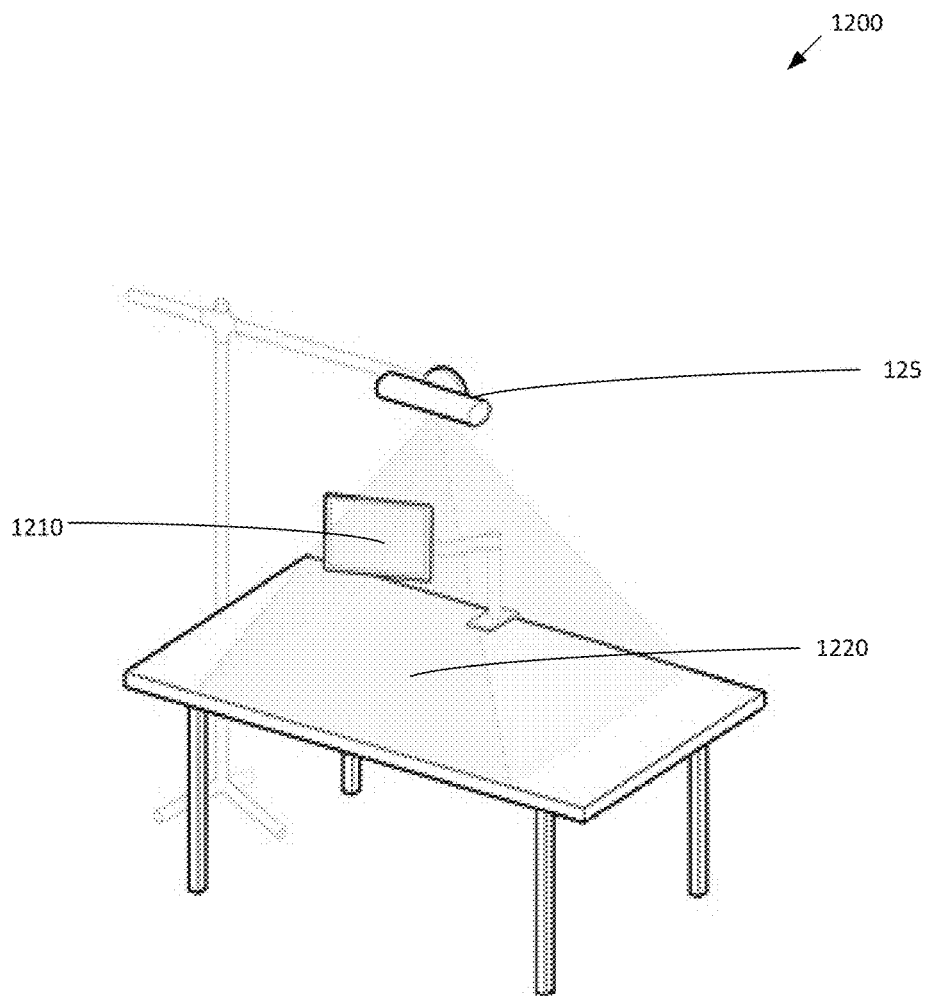
FIG. 12 is a conceptual illustration of a basic system for designing an article, according to various embodiments of the invention.

FIG. 12 is a conceptual illustration of a basic system for designing an article, according to various embodiments of the invention. As shown, the basic system configuration 1200 comprises an input camera 125 mounted above a tablet computer 1210 (comprising the computing device 101 and the display 150) and a work area 1220. The input tool 130 and input canvas 140 may be placed on the work area 1220 below the input camera 125 to allow scanning of the input canvas 140 and capturing of the movements and interactions of the input tool 130 and input canvas 140. The tablet computer 1210 may be conveniently placed to provide designing and modeling functions as described herein as well as visual feedback to the user.

Figure 13:
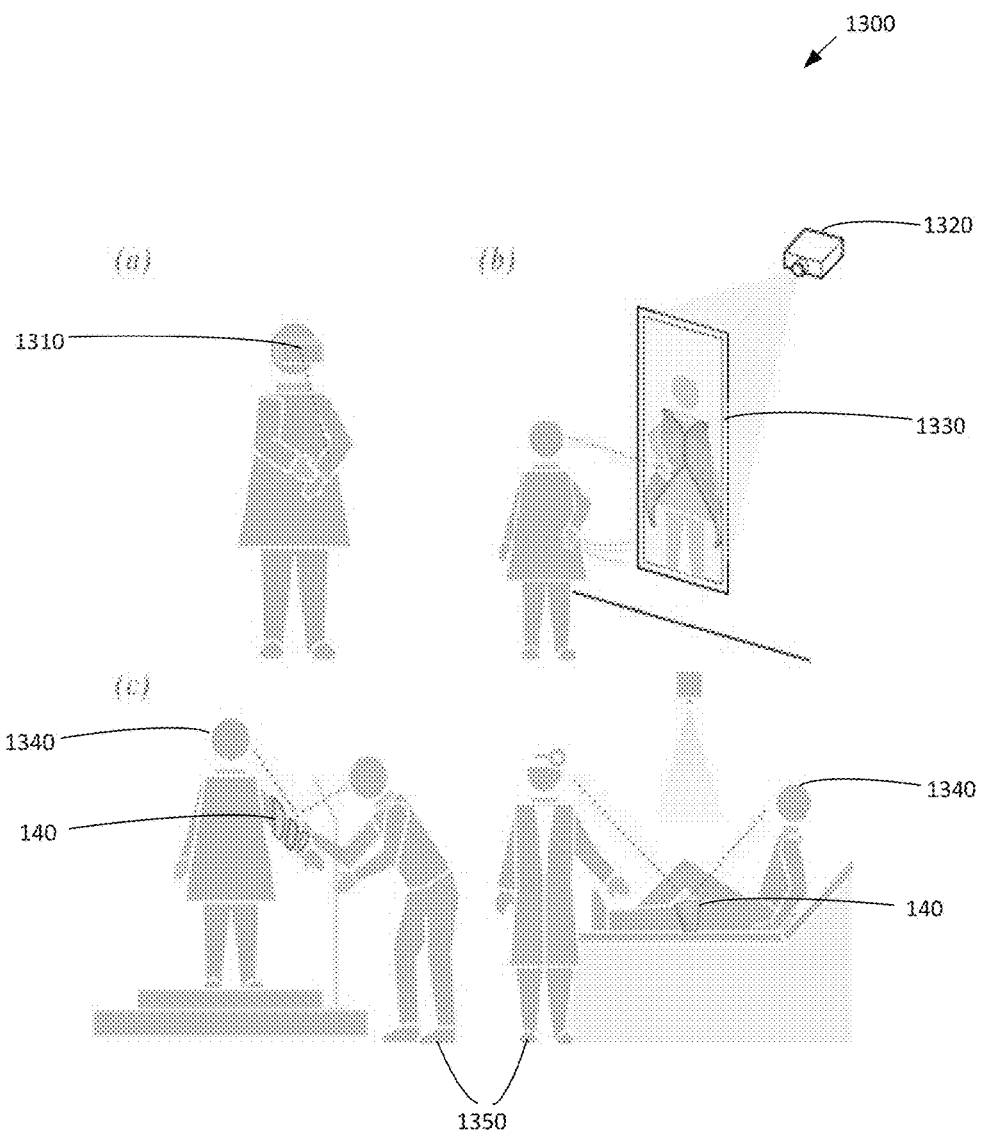
FIG. 13 is a conceptual illustration of various alternative systems for designing an article, according to various embodiments of the invention.

FIG. 13 is a conceptual illustration of various alternative systems for designing an article, according to various embodiments of the invention. A first-person system configuration is shown as image (a) in FIG. 12. In the first-person system configuration, the user has a direct line of sight to the intended canvas area (e.g., arm, hand, leg, foot, etc.). In the example of image (a), the user has a direct line of sight to his/her arm (the intended canvas area). In this type of system configuration, the display 150 may comprise an augmented reality device, such as a head-mounted display 1310 for providing visual feedback of the design process. Note that in the first-person system configuration, the head-mounted display 1310 is located on the user's face and provides a direct visual overlay of the virtual modeling of the input canvas 140 (e.g., as shown in the head-mounted display 1310) on the actual input canvas 140 itself. The head-mounted display 1310 may also provide a direct visual overlay of the virtual modeling of the article 120 (e.g., as shown in the head-mounted display 1310) on the actual input canvas 140 itself.

A second-person system configuration is shown as image (b) in FIG. 12. In the second-person system configuration, the user does not have a direct line of sight to the intended canvas area (e.g., back, face, neck, chest, full body, etc.). In the example of image (b), the user does not have a direct line of sight to his/her back (the intended canvas area) for designing a garment article. In this type of system configuration, the display 150 may comprise a combination of a projector 1320 (e.g., mobile or embedded projector) and screen 1330 (e.g., translucent screen) for providing visual feedback of the design process.

Two examples of a third-person system configuration is shown in image (c) in FIG. 12. The third-person system configuration may be appropriate when multiple users are collaborating on the design of the article. In the third-person system configuration, a first user 1340 is the person having the body part that is used as the input canvas 140 and a second different user 1350 is the person using the input tool 130 to performing gesture inputs on the input canvas 140 for designing/modeling the article for the input canvas 140. For example, the first user 1340 may be a customer and the second user 1350 a clothing designer for designing a garment article. As another example, the first user 1340 may be a patient and the second user 1350 a doctor for designing a medical device article. Thus, the third-person system configuration allows multiple users to participate in the design of the article.

In sum, a design engine 106 may be used to design an article to be worn on an input canvas (comprising a human body part) in a 3D virtual environment. A virtual model engine 115 of the design engine 106 may be used to generate and modify a virtual model of the input canvas 110 and/or a virtual model of the article 120 based on the skin-based gesture inputs detected by an input processing engine 112 of the design engine 106. The skin-based gesture inputs may comprise contacts/touches between an input tool 130 and the input canvas 140 at various locations on the input canvas 140. In other embodiments, the skin-based gesture inputs may comprise movement of only the input canvas 140. The input processing engine 112 may map interactions and movements of the input tool 130 and the input canvas 140 to different types of gesture inputs.

The virtual model engine 115 may implement three different design modes for receiving and processing gesture inputs for designing the article. For a direct manipulation and generative manipulation modes, a virtual model of the input canvas 110 is generated and then modified through received gesture inputs. In the direct manipulation mode, the virtual model of the input canvas 110 comprises a malleable virtual model of the input canvas. In the generative manipulation mode, the virtual model of the input canvas 110 comprises a heatmap virtual model of the input canvas. The modified virtual model of the input canvas 110 is then further processed to produce a virtual model of the article 120, which is exportable to a fabrication device for fabrication of the article. For the parametric manipulation mode, a virtual model of the input canvas 110 is generated and a virtual model of the article 120 is then generated based on the virtual model of the input canvas 110. The virtual model of the article 120 may comprise a parametric model that is modified through received gesture inputs. The final modified parametric model of the article is exportable to a fabrication device for fabrication of the article.

In all three modes, the resulting virtual model of the article 120 is based, at least in part, on the virtual model of the input canvas 110. Therefore, in all three modes, the resulting virtual model of the article 120 is based on the physical geometries of at least part of the input canvas 140 (body part). Also, in all three modes, the resulting virtual model of the article 120 may comprise a 3D digital design of the article that is exportable to the fabrication device 160 for physical fabrication of the article.

At least one advantage of the disclosed technique is that it enables an efficient and intuitive skin-based approach to modeling an article intended to be worn on a body part. Another advantage of the disclosed technique is that it enables custom design of articles to fit the specific complex physical geometries/characteristics of a human body part once fabricated. Another advantage of the disclosed technique is that it enables custom and personalized design for a particular individual.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for designing an article, the method comprising:
   capturing, via an image capturing device, a first set of contacts between an input tool and an input canvas at a first set of locations on the input canvas, wherein the input canvas comprises a body part of a user;
   determining a first input for a virtual model of the article based on the first set of contacts and the first set of locations; and
   modifying the virtual model of the article based on the first input to generate a modified virtual model of the article, the virtual model of the article being based on physical geometries of at least part of the input canvas.

2. The computer-implemented method of claim 1, wherein the virtual model of the article comprises a parametric virtual model of the article comprising parameters that are modifiable via inputs to the parametric virtual model.

3. The computer-implemented method of claim 2, further comprising generating the parametric virtual model of the article by:
   generating a surface based on physical geometries of at least a portion of the input canvas;
   subdividing the surface into a plurality of planes; and
   positioning an interactive module on each plane, a plurality of interactive modules on the plurality of planes comprising the parametric virtual model of the article.

4. The computer-implemented method of claim 3, further comprising connecting the plurality of interactive modules to one another to produce a closed mesh.

5. The computer-implemented method of claim 3, wherein each interactive module comprises a plurality of parameters preconfigured with default values that are modifiable by inputs to the parametric virtual model.

6. The computer-implemented method of claim 3, wherein the surface is generated using a three-dimensional (3D) scan of the input canvas received from an input camera.

7. The computer-implemented method of claim 3, wherein each interactive module is programmed as a pyramid with a spring along each edge of the pyramid and a repelling particle at a top of the pyramid.

8. The computer-implemented method of claim 1, further comprising exporting the modified virtual model of the article to a fabrication device.

9. The computer-implemented method of claim 1, wherein the first input comprises a touch input, a poke input, a rub input, a drag input, a grab input, or a resize input.

10. One or more non-transitory computer-readable media storing program instructions that, when executed by a processor, cause the processor to design an article for a body part of a user by performing the steps of:
    obtaining from an image capturing device a first set of contacts between an input tool and an input canvas at a first set of locations on the input canvas, wherein the input canvas comprises the body part of the user;
    determining a first input for a virtual model of the article based on the first set of contacts and the first set of locations; and
    modifying the virtual model of the article based on the first input to generate a modified virtual model of the article, the virtual model of the article based on physical geometries of at least part of the input canvas.

11. The one or more non-transitory computer-readable media of claim 10, wherein the virtual model of the article comprises a parametric virtual model of the article comprising parameters modifiable by inputs to the parametric virtual model.

12. The one or more non-transitory computer-readable media of claim 11, further comprising producing the parametric virtual model of the article by:
    generating a surface based on physical geometries of at least part of the input canvas;
    subdividing the surface into a plurality of planes;
    positioning an interactive module on each plane; and
    connecting the interactive modules to produce the parametric virtual model of the article.

13. The one or more non-transitory computer-readable media of claim 12, wherein each interactive module comprises a plurality of parameters preconfigured with default values that are modifiable by inputs to the parametric virtual model.

14. The one or more non-transitory computer-readable media of claim 12, wherein the interactive modules are connected to form a closed mesh to produce the parametric virtual model of the article.

15. The one or more non-transitory computer-readable media of claim 12, wherein the interactive modules are connected by connecting each interactive module to its neighboring interactive modules at its base and connecting edges of the interactive modules to the base surface.

16. The one or more non-transitory computer-readable media of claim 10, further comprising exporting the modified virtual model of the article to a fabrication device.

17. A system comprising:
    a memory that includes instructions for a design engine; and
    a processor that is coupled to the memory and, upon executing the instructions for the design engine, is configured to:
       obtain from an image capturing device a first set of contacts between an input tool and an input canvas at a first set of locations on the input canvas, wherein the input canvas comprises the body part of a user;

determine a first input for a virtual model of the article based on the first set of contacts and the first set of locations; and modify the virtual model of the article based on the first input to generate a modified virtual model of the article, the virtual model of the article based on physical geometries of at least part of the input canvas.

18. The system of claim 17, further comprising an input camera for capturing movement and interactions of the input tool and input canvas.

19. The system of claim 17, further comprising a head-mounted display for displaying the modified virtual model of the article as an overlay on the input canvas.

20. The system of claim 17, further comprising a projector and screen for displaying the modified virtual model of the article in real-time.

21. The computer-implemented method of claim 1, wherein the article is designed for wearing on the body part of the user.

22. The computer-implemented method of claim 1, wherein the first input comprises a skin-based gesture input on the body part of the user.

23. The computer-implemented method of claim 1, wherein the first set of contacts between the input tool and the input canvas comprises at least one of a skin-based contact between a single point on the input tool at a single location on the input canvas, a skin-based contact between a single point on the input tool at a plurality of locations on the input canvas, and a set of skin-based contacts between a plurality of points on the input tool at a plurality of locations on the input canvas.

24. The computer-implemented method of claim 1, wherein the input tool comprises at least one of a hand of the user, a finger of the user, and a fingertip of the user.

* * * * *